United States Patent
Guadiz

(10) Patent No.: US 9,537,436 B2
(45) Date of Patent: *Jan. 3, 2017

(54) ALTERNATOR OVERVOLTAGE PROTECTION CIRCUIT

(71) Applicant: MTD Products Inc, Valley City, OH (US)

(72) Inventor: Maynard S. Guadiz, Strongsville, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/885,386

(22) Filed: Oct. 16, 2015

(65) Prior Publication Data

US 2016/0043675 A1 Feb. 11, 2016

Related U.S. Application Data

(63) Continuation of application No. 14/147,223, filed on Jan. 3, 2014, now Pat. No. 9,197,058.

(60) Provisional application No. 61/749,295, filed on Jan. 5, 2013.

(51) Int. Cl.
*H02H 7/06* (2006.01)
*H02P 9/00* (2006.01)
(Continued)

(52) U.S. Cl.
CPC .............. *H02P 9/006* (2013.01); *H02H 3/202* (2013.01); *H02H 7/065* (2013.01); *H02H 7/09* (2013.01); *H02P 9/04* (2013.01)

(58) Field of Classification Search
CPC . H01L 2924/00; G02B 6/0018; G02B 6/0028; G02B 6/0068; G02B 6/0076
See application file for complete search history.

(56) References Cited

U.S. PATENT DOCUMENTS 3,902,080 A * 8/1975 St. Clair .............. H03K 17/136
315/199
3,932,789 A * 1/1976 Sons ...................... H02H 7/085
361/31
(Continued)

FOREIGN PATENT DOCUMENTS

CN 202309036 U 7/2012
JP 2010-007623 A 1/2010
KR 20020096720 A 12/2002

OTHER PUBLICATIONS

International Search Report and Written Opinion dated Apr. 18, 2014 for corresponding application No. PCT/US2014/010237.
(Continued)

*Primary Examiner* — Kawing Chan
*Assistant Examiner* — Zoheb Imtiaz
(74) *Attorney, Agent, or Firm* — Wegman, Hessler & Vanderburg

(57) ABSTRACT

Disclosed is an alternator overvoltage protection circuit having a TRIAC and a MOSFET. The TRIAC is electrically connected to the MOSFET and the TRIAC is electrically connected to a magneto. The TRIAC is configured to ground the magneto when triggered by the MOSFET. The MOSFET is electrically connected to an alternator and configured to conduct when the alternator operates in an overvoltage condition. Also disclosed is a method of alternator overvoltage protection for a piece of outdoor power equipment, the method including providing a TRIAC and an alternator rotated by an engine having a magneto, wherein the alternator outputs a voltage when rotated by the engine. The method further includes configuring the TRIAC to ground the magneto when the alternator operates in an overvoltage condition, thereby disabling the magneto, which stops the rotation of the engine and stops the alternator from outputting voltage.

6 Claims, 18 Drawing Sheets

(51) Int. Cl.
  *H02H 7/09* (2006.01)
  *H02H 3/20* (2006.01)
  *H02P 9/04* (2006.01)

(56) References Cited

U.S. PATENT DOCUMENTS

| | | | | |
|---|---|---|---|---|
| 4,166,975 A | * | 9/1979 | Germer | F16D 48/064 |
| | | | | 324/116 |
| 4,366,678 A | * | 1/1983 | Yamazaki | F25D 17/045 |
| | | | | 236/75 |
| 4,465,965 A | * | 8/1984 | Chernotsky | H02J 3/14 |
| | | | | 307/35 |
| 4,476,415 A | * | 10/1984 | Kautz | G05D 3/14 |
| | | | | 318/135 |
| 4,972,883 A | * | 11/1990 | Hassell | A47J 31/402 |
| | | | | 141/1 |
| 5,285,344 A | * | 2/1994 | Heitzmann | H02H 9/041 |
| | | | | 361/18 |
| 6,114,775 A | | 9/2000 | Chung et al. | |
| 2002/0109952 A1 | | 8/2002 | Rapsinski | |
| 2007/0241565 A1 | | 10/2007 | Ogawa et al. | |

OTHER PUBLICATIONS

Office Action and search report dated Mar. 23, 2016, and English translation thereof, for corresponding Chinese patent application No. 201480011928.8.

\* cited by examiner

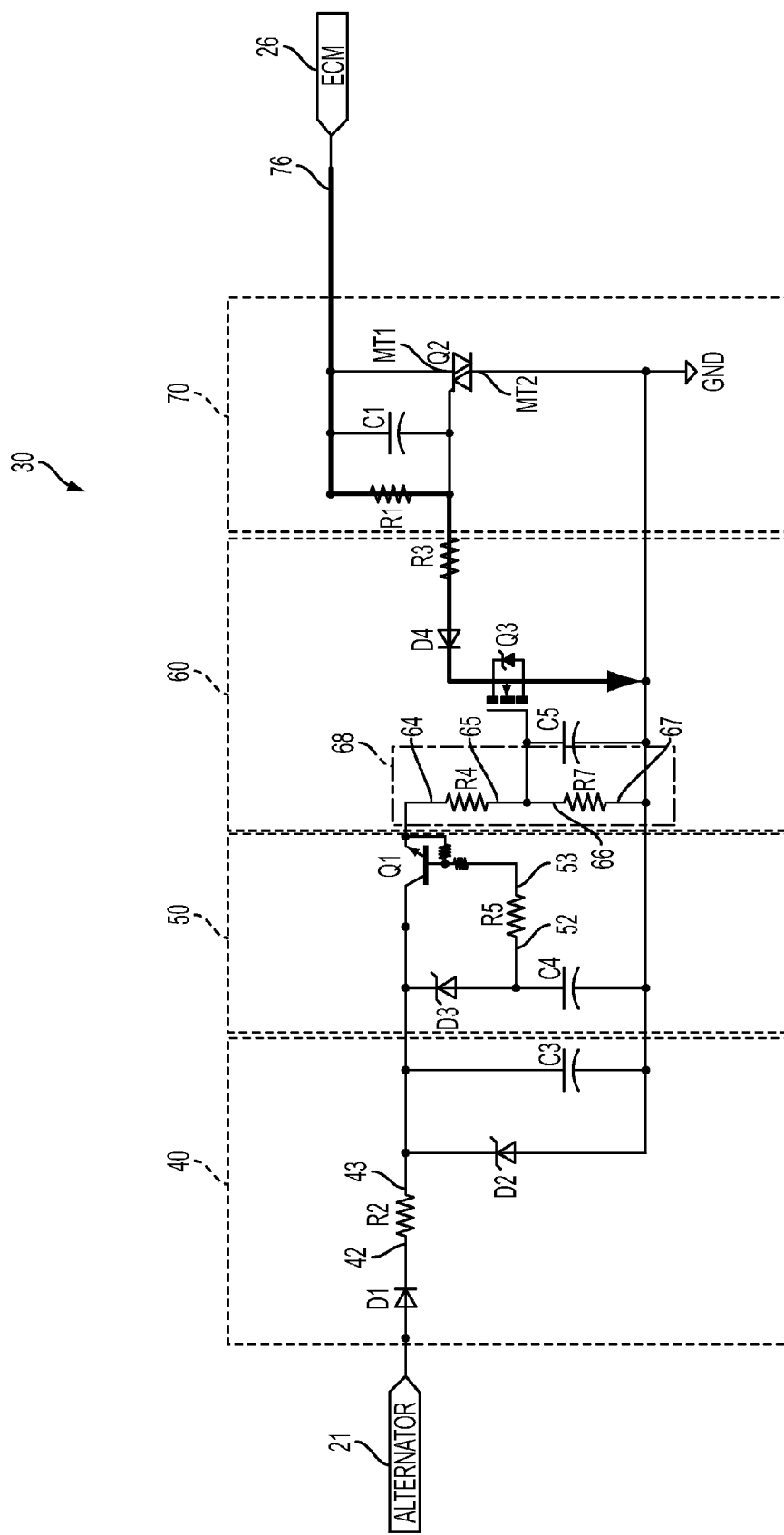

ALTERNATOR OVERVOLTAGE PROTECTION CIRCUIT

CROSS-REFERENCE TO RELATED APPLICATIONS

The present application is a continuation application and claims priority under 35 U.S.C. §120 to U.S. patent application Ser. No. 14/147,223 filed Jan. 3, 2014 (pending), and to U.S. Provisional Patent Application Ser. No. 61/749,295 filed Jan. 5, 2013, both entitled "ALTERNATOR OVERVOLTAGE PROTECTION CIRCUIT", which are herein incorporated by reference in their entirety.

FIELD OF THE INVENTION

The present invention is directed to outdoor power equipment, and more particularly to an alternator overvoltage protection circuit for a piece of outdoor power equipment.

BACKGROUND OF THE INVENTION

Under typical operating conditions, the voltage output of an alternator in a piece of outdoor power equipment is typically regulated by a battery in the piece of outdoor power equipment. However, an alternator overvoltage condition, in which the voltage output of the alternator becomes excessive, can occur by a sudden loss of connection to the battery. Further, an alternator overvoltage condition can also occur when a piece of outdoor power equipment with a failed or damaged (sulfated) battery is jump started from an external source, and the external source, which regulated the alternator when connected, is removed after the engine is operating.

Therefore, a need exists for an alternator overvoltage protection circuit for a piece of outdoor power equipment.

BRIEF SUMMARY OF THE INVENTION

In one aspect of the invention, an alternator overvoltage protection circuit comprises a TRIAC and a MOSFET; the TRIAC is electrically connected to the MOSFET, the TRIAC is electrically connected to a magneto, wherein the TRIAC is configured to ground the magneto when triggered by the MOSFET; and the MOSFET is electrically connected to an alternator, wherein the MOSFET is configured to conduct when the alternator operates in an overvoltage condition.

In another aspect of the invention, the alternator is connected to and rotated by an engine, wherein the magneto is connected to and provides spark to the engine.

In a further aspect of the invention, the alternator provides a voltage output; wherein grounding the magneto with the TRIAC disables the magneto and stops the voltage output from the alternator.

In another aspect of the invention, the alternator overvoltage protection circuit further comprises a transistor; wherein the transistor is electrically connected to the alternator, wherein the transistor is configured to conduct when the alternator operates in the overvoltage condition.

In a further aspect of the invention, the overvoltage condition is present when the alternator outputs a voltage greater than about 18.65 VDC.

In another aspect of the invention, the overvoltage condition is present when the alternator outputs a voltage greater than about 15 VDC.

In a further aspect of the invention, the overvoltage condition is present when the alternator outputs a voltage greater than about 20 VDC.

In yet another aspect of an embodiment of the invention, an alternator overvoltage protection circuit comprises a TRIAC and a MOSFET; the TRIAC is electrically connected to the MOSFET, the TRIAC is electrically connected to a magneto, wherein the TRIAC is configured to ground the magneto when triggered by the MOSFET; and the MOSFET is electrically connectable to an alternator, wherein the MOSFET is configured to conduct when the alternator operates in an overvoltage condition.

In another aspect of the invention, the alternator is connected to and rotated by an engine, wherein the magneto is connected to and provides spark to the engine.

In a further aspect of the invention, the alternator provides a voltage output; wherein grounding the magneto with the TRIAC disables the magneto and stops the voltage output from the alternator.

In another aspect of the invention, the alternator overvoltage protection circuit further comprises a transistor; wherein the transistor is electrically connectable to the alternator, wherein the transistor is configured to conduct when the alternator operates in the overvoltage condition.

In a further aspect of the invention, the overvoltage condition is present when the alternator outputs a voltage greater than about 18.65 VDC.

In another aspect of the invention, the overvoltage condition is present when the alternator outputs a voltage greater than about 15 VDC.

In a further aspect of the invention, the overvoltage condition is present when the alternator outputs a voltage greater than about 20 VDC.

In yet another aspect of an embodiment of the invention, a method of alternator overvoltage protection for a piece of outdoor power equipment comprises providing a TRIAC and an alternator rotated by an engine having a magneto, wherein the alternator outputs a voltage when rotated by the engine; and configuring the TRIAC to ground the magneto when the alternator operates in an overvoltage condition, thereby disabling the magneto, stopping the rotation of the engine, and stopping the alternator from outputting voltage.

In another aspect of the invention, the method further comprises providing a transistor and a MOSFET; configuring the transistor to conduct when the alternator operates in the overvoltage condition; configuring the MOSFET to conduct when a voltage is imposed on a gate of the MOSFET by the conducting transistor; and configuring the MOSFET to direct a portion of current from the magneto to trigger a gate of the TRIAC when the MOSFET is conducting, thereby causing the TRIAC to conduct.

In a further aspect of the invention, the overvoltage condition is present when the alternator output voltage is greater than about 18.65 VDC.

In another aspect of the invention, the overvoltage condition is present when the alternator output voltage is greater than about 15 VDC.

In a further aspect of the invention, the overvoltage condition is present when the alternator output voltage is greater than about 20 VDC.

In yet another aspect of an embodiment of the invention, an alternator overvoltage protection circuit comprises a conditioner section, a trigger section, a drive section, and a disable section; the conditioner section is connectable to an alternator rotated by an engine, and the disable section is connectable to a load; the trigger section is located between and electrically connected to the conditioner section and the drive section; the drive section is located between and electrically connected to the trigger section and the disable section; the load is a magneto connected to and configured to supply spark to the engine; the conditioner section is configured to condition voltage output received from the alternator, and output the conditioned voltage to the trigger section; the trigger section is configured to receive the conditioned voltage from the conditioner section; the trigger section is further configured to output current to the drive section when the alternator output voltage exceeds an alternator overvoltage threshold, wherein the trigger section does not output current to the drive section when the alternator output voltage does not exceed the alternator overvoltage threshold; the drive section is configured to activate the disable section when the drive section receives current from the trigger section; and the disable section is configured to divert at least a portion of current away from the magneto to a ground of the alternator overvoltage protection circuit through a low impedance path when the disable section is activated, thereby removing spark from and disabling the engine.

In another aspect of the invention, the disable section comprises a disable TRIAC having a main terminal 1 (MT1) connected to the magneto and a main terminal 2 (MT2) connected to the ground, wherein the disable TRIAC is configured to conduct when the disable section is activated, thereby creating a first current path between the magneto at the MT1 and the ground at the MT2.

In a further aspect of the invention, the disable TRIAC is configured to trigger and conduct in quadrant 3.

In another aspect of the invention, the drive section activates the disable section by creating a low impedance path through the drive section between the magneto and the ground, the low impedance path between the magneto and the ground creates a second current path and a third current path; the third current path uses a portion of current provided by the magneto to produce a voltage at a gate of the disable TRIAC, the second current path removes current from the gate of the disable TRIAC, thereby causing disable TRIAC to conduct, wherein the voltage produced at the gate of the disable TRIAC and the current removed from the gate of the disable TRIAC are sufficient for the disable TRIAC to trigger and conduct in quadrant 3.

In a further aspect of the invention, the low impedance path created by the drive section is comprised of a drive MOSFET; the drive MOSFET is configured to transition from a high impedance state to a low impedance state when the trigger section provides current to the drive section; wherein the current provided from the trigger section to the drive section flows through a drive voltage divider in the drive section, which produces a voltage at a gate of the drive MOSFET sufficient for the path between a drain and a source of the drive MOSFET to transition from high impedance state to a low impedance state.

In another aspect of the invention, the drive voltage divider is configured to charge a drive capacitor of the drive section, wherein the drive capacitor is connected to the gate of the drive MOSFET and contains sufficient charge to maintain the drive MOSFET in the low impedance state for a few seconds after the engine stops rotating.

In a further aspect of the invention, the trigger section is comprised of a trigger transistor configured to receive current from the alternator through the conditioner section, the trigger transistor is further configured to provide current to the drive voltage divider when the alternator output voltage exceeds the alternator overvoltage threshold.

In another aspect of the invention, the alternator overvoltage threshold is about 15 VDC.

In a further aspect of the invention, the alternator overvoltage threshold is about 18.65 VDC.

In another aspect of the invention, the alternator overvoltage threshold is about 20 VDC.

In a further aspect of the invention, the conditioner section is comprised of a conditioner diode, a conditioner resistor, a conditioner zener diode, and a conditioner capacitor; an anode of the conditioner diode receives the voltage output from the alternator; a first end of the conditioner resistor is connected to a cathode of the conditioner diode and a second end of the conditioner resistor is connected to the trigger section, the conditioner zener diode and the conditioner capacitor are connected in parallel, a cathode of the conditioner zener diode and an anode of the conditioner capacitor are connected to the second end of the conditioner resistor; an anode of the conditioner zener diode and a cathode of the conditioner capacitor are connected to the ground; the trigger section is comprised of a trigger zener diode, a trigger capacitor, a trigger resistor, and a trigger transistor; a cathode of the trigger zener diode and a collector of the trigger transistor are connected to a second end of the conditioner resistor, the cathode of the conditioner zener diode, and the anode of the conditioner capacitor; an anode of the trigger zener diode, a first end of the trigger resistor and an anode of the trigger capacitor are connected; a cathode of the trigger capacitor is connected to the ground; a second end of the trigger resistor is connected to a base of the trigger transistor; an emitter of the trigger transistor is connected to the drive section; the drive section is comprised of a first drive resistor, a second drive resistor, a third drive resistor, a drive capacitor, a drive diode, and a drive MOSFET; a first end of the second drive resistor receives current from the emitter of the trigger transistor; a second end of the third drive resistor is connected to the ground; a second end of the second drive resistor and a first end of the third drive resistor are connected; the second drive resistor and the third drive resistor comprise a drive voltage divider between the emitter of the trigger transistor and the ground; an anode of the drive capacitor is connected to the second end of the second drive resistor, the first end of the third drive resistor, and a gate of the drive MOSFET; a source of the drive MOSFET is connected to the ground and a drain of the drive MOSFET is connected to a cathode of the drive diode; an anode of drive diode is connected to a second end of the first drive resistor, and a first end of the first drive resistor is connected to the disable section; and the disable section is comprised of a disable resistor, a disable capacitor, and a disable TRIAC; a second end of the disable resistor, a cathode of the disable capacitor, and a gate of the disable TRIAC are connected to the first end of the first drive resistor; a first end of the disable resistor, an anode of the disable capacitor, and a main terminal 1 (MT1) of the disable TRIAC are connectable to the magneto; a main terminal 2 (MT2) of the disable TRIAC is connected to the ground.

In yet another aspect of an embodiment of the invention, an alternator overvoltage protection circuit comprises: a conditioner section, a trigger section, a drive section, and a disable section; the conditioner section is connectable to an alternator rotated by an engine, and the disable section is connectable to a load; the trigger section is located between and electrically connected to the conditioner section and the drive section; the drive section is located between and electrically connected to the trigger section and the disable section; the load is a coil of an engine component, wherein removal of power from the coil is configured to disable the engine; the alternator is configured to provide power to the coil through a disable resistive element of the disable section, wherein a second end of the disable resistive element is connected to a first end of the coil; the conditioner section is configured to condition voltage output received from the alternator, and output the conditioned voltage to the trigger section; the trigger section is configured to receive the conditioned voltage from the conditioner section; the trigger section is further configured to output current to the drive section when the alternator output voltage exceeds an alternator overvoltage threshold, wherein the trigger section does not output current to the drive section when the alternator output voltage does not exceed the alternator overvoltage threshold; the drive section is configured to activate the disable section when the drive section receives current from the trigger section; and the disable section is configured to divert at least a portion of current away from the coil to a ground of the alternator overvoltage protection circuit through a low impedance path when the disable section is activated, thereby disabling the engine.

In another aspect of the invention, the disable section comprises a disable TRIAC having a main terminal 1 (MT1) connected to the second end of the disable resistive element and a main terminal 2 (MT2) connected to the ground, wherein the disable TRIAC is configured to conduct when the disable section is activated, thereby creating a first current path between the second end of the disable resistive element at the MT1 and the ground at the MT2.

In a further aspect of the invention, the disable TRIAC is configured to trigger and conduct in quadrant 3.

In another aspect of the invention, the drive section activates the disable section by creating a low impedance path through the drive section between the second end of the disable resistive element and the ground, the low impedance path between the second end of the disable resistive element and the ground creates a second current path and a third current path; the third current path uses a portion of current provided by the disable resistive element to produce a voltage at a gate of the disable TRIAC, the second current path removes current from the gate of the disable TRIAC, thereby causing disable TRIAC to conduct, wherein the voltage produced at the gate of the disable TRIAC and the current removed from the gate of the disable TRIAC are sufficient for the disable TRIAC to trigger and conduct in quadrant 3.

In a further aspect of the invention, the low impedance path created by the drive section is comprised of a drive MOSFET; the drive MOSFET is configured to transition from a high impedance state to a low impedance state when the trigger section provides current to the drive section; wherein the current provided from the trigger section to the drive section flows through a drive voltage divider in the drive section, which produces a voltage at a gate of the drive MOSFET sufficient for the path between a drain and a source of the drive MOSFET to transition from high impedance state to a low impedance state.

In another aspect of the invention, the drive voltage divider is configured to charge a drive capacitor of the drive section, wherein the drive capacitor is connected to the gate of the drive MOSFET and contains sufficient charge to maintain the drive MOSFET in the low impedance state for a few seconds after the engine stops rotating.

In a further aspect of the invention, the trigger section is comprised of a trigger transistor configured to receive current from the alternator through the conditioner section, the trigger transistor is further configured to provide current to the drive voltage divider when the alternator output voltage exceeds the alternator overvoltage threshold.

In another aspect of the invention, the alternator overvoltage threshold is about 15 VDC.

In a further aspect of the invention, the alternator overvoltage threshold is about 18.65 VDC.

In another aspect of the invention, the alternator overvoltage threshold is about 20 VDC.

In a further aspect of the invention, the disable resistive element is comprised of a fuse with a current flow rating less than that of the amount of current flowing through the low impedance path when the disable section is activated, wherein the fuse of the resistive element is configured blow when the current flows through the low impedance path upon the activation of the disable section, thereby removing power from the coil and disabling the engine.

In another aspect of the invention, the disable resistive element is comprised of a resistor having a resistance value such that the coil drops out, due to the flow of current through the low impedance path, when the disable section is activated, wherein the dropping out of the coil disables the engine.

In another aspect of the invention, the coil is a fuel solenoid coil, air intake valve coil, and/or a fuel pump relay coil.

In a further aspect of the invention, the conditioner section is comprised of a conditioner diode, a conditioner resistor, a conditioner zener diode, and a conditioner capacitor; an anode of the conditioner diode receives the voltage output from the alternator; a first end of the conditioner resistor is connected to a cathode of the conditioner diode and a second end of the conditioner resistor is connected to the trigger section, the conditioner zener diode and the conditioner capacitor are connected in parallel, a cathode of the conditioner zener diode and an anode of the conditioner capacitor are connected to the second end of the conditioner resistor; an anode of conditioner zener diode and a cathode of conditioner capacitor are connected to the ground; the trigger section is comprised of a trigger zener diode, a trigger capacitor, a trigger resistor, and a trigger transistor; a cathode of the trigger zener diode and a collector of the trigger transistor are connected to a second end of the conditioner resistor, the cathode of the conditioner zener diode, and an anode of the conditioner capacitor; an anode of the trigger zener diode, a first end of the trigger resistor and an anode of the trigger capacitor are connected; a cathode of the trigger capacitor is connected to the ground; a second end of the trigger resistor is connected to a base of the trigger transistor; an emitter of the trigger transistor is connected to the drive section; the drive section is comprised of a first drive resistor, a second drive resistor, a third drive resistor, a drive capacitor, a drive diode, and a drive MOSFET; a first end of the second drive resistor receives current from the emitter of the trigger transistor; a second end of the third drive resistor is connected to the ground; a second end of the second drive resistor and a first end of the third drive resistor are connected; the second drive resistor and the third drive resistor comprise a drive voltage divider between the emitter of the trigger transistor and the ground; an anode of the drive capacitor is connected to the second end of the second drive resistor, the first end of the third drive resistor, and a gate of the drive MOSFET; a source of the drive MOSFET is connected to the ground and a drain of the drive MOSFET is connected to a cathode of the drive diode; an anode of drive diode is connected to a second end of the first drive resistor, and a first end of the first drive resistor is connected to the disable section; and the disable section is comprised of a disable resistive element, a disable resistor, a disable capacitor, a disable resistive element, and a disable TRIAC; a second end of the disable resistor, a cathode of the disable capacitor, and a gate of the disable TRIAC are connected to the first end of the first drive resistor; a first end of the disable resistor, an anode of the disable capacitor, a second end of a disable resistive element, and a main terminal 1 (MT1) of the disable TRIAC are connectable to the first end of the coil; a main terminal 2 (MT2) of the disable TRIAC is connected to the ground; a first of end of the disable resistive element is connectable to the alternator.

In yet another aspect of an embodiment of the invention, a piece of outdoor power equipment comprises an alternator, an engine, and an alternator overvoltage protection circuit; the alternator is connected to the engine; the alternator overvoltage protection circuit comprising a conditioner section, a trigger section, a drive section, and a disable section; the conditioner section is connected to the alternator rotated by the engine of the piece of outdoor power equipment, and the disable section is electrically connected to a load; the trigger section is located between and electrically connected to the conditioner section and the drive section; the drive section is located between and electrically connected to the trigger section and the disable section; the conditioner section is configured to condition voltage output received from the alternator, and output the conditioned voltage to the trigger section; the trigger section is configured to receive the conditioned voltage from the conditioner section; the trigger section is further configured to output current to the drive section when the alternator output voltage exceeds an alternator overvoltage threshold, wherein the trigger section does not output current to the drive section when the alternator output voltage does not exceed the alternator overvoltage threshold; the drive section is configured to activate the disable section when the drive section receives current from the trigger section; and the disable section is configured to divert at least a portion of current away from the load to a ground of the alternator overvoltage protection circuit through a low impedance path when the disable section is activated, thereby disabling the engine.

In another aspect of the invention, the load is a coil of an engine component, the disable section is configured to divert at least a portion of current away from the coil to a ground of the alternator overvoltage protection circuit through a low impedance path when the disable section is activated, wherein diverting a portion of current away from the coil to a ground either causes the coil to drop out or causes a fuse to blow in a disable resistive element that delivers power to the coil, thereby disabling the engine.

In a further aspect of the invention, the load is a magneto connected to and configured to supply spark to the engine; wherein the disable section is configured to divert at least a portion of current away from the magneto to a ground of the alternator overvoltage protection circuit through a low impedance path when the disable section is activated, thereby removing spark from and disabling the engine.

In a further aspect of the invention, the coil is a fuel solenoid coil, air intake valve coil, and/or a fuel pump relay coil.

In yet another aspect of an embodiment of the invention, a method of protecting a piece of outdoor power equipment in an overvoltage condition, the method comprising providing a piece of outdoor power equipment comprising an alternator overvoltage protection circuit, wherein the alternator overvoltage protection circuit comprises a conditioner section, a trigger section, a drive section, and a disable section; the conditioner section is connected to an alternator having an output voltage rotated by an engine of the piece of outdoor power equipment, and the disable section is electrically connected to a load; the trigger section is located between and electrically connected to the conditioner section and the drive section; the drive section is located between and electrically connected to the trigger section and the disable section; conditioning the voltage output received from the alternator using the conditioner section, and providing the conditioned voltage to the trigger section; receiving the conditioned voltage with the trigger section from the conditioner section; outputting current from the trigger section to the drive section when the alternator output voltage exceeds an alternator overvoltage threshold, wherein the trigger section does not output current to the drive section when the alternator output voltage does not exceed the alternator overvoltage threshold; activating the disable section using the drive section when the drive section receives current from the trigger section; and wherein the disable section is configured to divert at least a portion of current away from the load to a ground of the alternator overvoltage protection circuit, thereby disabling the engine; wherein the portion of current diverted away from the load travels to ground through a low impedance path.

In another aspect of the invention, the load is a coil of an engine component, the disable section diverts at least a portion of current away from the coil to a ground of the alternator overvoltage protection circuit through a low impedance path when the disable section is activated, wherein diverting a portion of current away from the coil to the ground either causes the coil to drop out or causes a fuse to blow in a disable resistive element that delivers power to the coil, thereby disabling the engine.

In a further aspect of the invention, the coil is a fuel solenoid coil, air intake valve coil, and/or a fuel pump relay coil.

In a further aspect of the invention, the load is a magneto connected to and configured to supply spark to the engine; wherein the disable section diverts at least a portion of current away from the magneto to the ground of the alternator overvoltage protection circuit through a low impedance path when the disable section is activated, thereby removing spark from and disabling the engine.

In yet another aspect of an embodiment of the invention, an alternator overvoltage protection circuit comprises a conditioner section, a trigger section, a drive section, and a disable section; the conditioner section is connectable to an alternator rotated by an engine, and the disable section is connectable to a load; the trigger section is located between and electrically connected to the conditioner section and the drive section; the drive section is located between and electrically connected to the trigger section and the disable section; the load is an engine control module (ECM) connected to and configured to control the operation of the engine; the conditioner section is configured to condition voltage output received from the alternator, and output the conditioned voltage to the trigger section; the trigger section is configured to receive the conditioned voltage from the conditioner section; the trigger section is further configured to output current to the drive section when the alternator output voltage exceeds an alternator overvoltage threshold, wherein the trigger section does not output current to the drive section when the alternator output voltage does not exceed the alternator overvoltage threshold; the drive section is configured to activate the disable section when the drive section receives current from the trigger section; and the disable section is configured to divert at least a portion of current away from the ECM to a ground of the alternator overvoltage protection circuit through a low impedance path when the disable section is activated, thereby grounding a kill pin of the ECM and disabling the engine.

In another aspect of the invention, the disable section comprises a disable TRIAC having a main terminal 1 (MT1) connected to the ECM and a main terminal 2 (MT2) connected to the ground, wherein the disable TRIAC is configured to conduct when the disable section is activated, thereby creating a first current path between the ECM at the MT1 and the ground at the MT2.

In a further aspect of the invention, the disable TRIAC is configured to trigger and conduct in quadrant 3.

In another aspect of the invention, the drive section activates the disable section by creating a low impedance path through the drive section between the ECM and the ground, the low impedance path between the ECM and the ground creates a second current path and a third current path; the third current path uses a portion of current provided by the ECM to produce a voltage at a gate of the disable TRIAC, the second current path removes current from the gate of the disable TRIAC, thereby causing disable TRIAC to conduct, wherein the voltage produced at the gate of the disable TRIAC and the current removed from the gate of the disable TRIAC are sufficient for the disable TRIAC to trigger and conduct in quadrant 3.

In a further aspect of the invention, the low impedance path created by the drive section is comprised of a drive MOSFET; the drive MOSFET is configured to transition from a high impedance state to a low impedance state when the trigger section provides current to the drive section; wherein the current provided from the trigger section to the drive section flows through a drive voltage divider in the drive section, which produces a voltage at a gate of the drive MOSFET sufficient for the path between a drain and a source of the drive MOSFET to transition from high impedance state to a low impedance state.

In another aspect of the invention, the drive voltage divider is configured to charge a drive capacitor of the drive section, wherein the drive capacitor is connected to the gate of the drive MOSFET and contains sufficient charge to maintain the drive MOSFET in the low impedance state for a few seconds after the engine stops rotating.

In a further aspect of the invention, the trigger section is comprised of a trigger transistor configured to receive current from the alternator through the conditioner section, the trigger transistor is further configured to provide current to the drive voltage divider when the alternator output voltage exceeds the alternator overvoltage threshold.

In another aspect of the invention, the alternator overvoltage threshold is about 15 VDC.

In a further aspect of the invention, the alternator overvoltage threshold is about 18.65 VDC.

In another aspect of the invention, the alternator overvoltage threshold is about 20 VDC.

In a further aspect of the invention, the conditioner section is comprised of a conditioner diode, a conditioner resistor, a conditioner zener diode, and a conditioner capacitor; an anode of the conditioner diode receives the voltage output from the alternator; a first end of the conditioner resistor is connected to a cathode of the conditioner diode and a second end of the conditioner resistor is connected to the trigger section, the conditioner zener diode and the conditioner capacitor are connected in parallel, a cathode of the conditioner zener diode and an anode of the conditioner capacitor are connected to the second end of the conditioner resistor; an anode of the conditioner zener diode and a cathode of the conditioner capacitor are connected to the ground; the trigger section is comprised of a trigger zener diode, a trigger capacitor, a trigger resistor, and a trigger transistor; a cathode of the trigger zener diode and a collector of the trigger transistor are connected to a second end of the conditioner resistor, the cathode of the conditioner zener diode, and the anode of the conditioner capacitor; an anode of the trigger zener diode, a first end of the trigger resistor and an anode of the trigger capacitor are connected; a cathode of the trigger capacitor is connected to the ground; a second end of the trigger resistor is connected to a base of the trigger transistor; an emitter of the trigger transistor is connected to the drive section; the drive section is comprised of a first drive resistor, a second drive resistor, a third drive resistor, a drive capacitor, a drive diode, and a drive MOSFET; a first end of the second drive resistor receives current from the emitter of the trigger transistor; a second end of the third drive resistor is connected to the ground; a second end of the second drive resistor and a first end of the third drive resistor are connected; the second drive resistor and the third drive resistor comprise a drive voltage divider between the emitter of the trigger transistor and the ground; an anode of the drive capacitor is connected to the second end of the second drive resistor, the first end of the third drive resistor, and a gate of the drive MOSFET; a source of the drive MOSFET is connected to the ground and a drain of the drive MOSFET is connected to a cathode of the drive diode; an anode of drive diode is connected to a second end of the first drive resistor, and a first end of the first drive resistor is connected to the disable section; and the disable section is comprised of a disable resistor, a disable capacitor, and a disable TRIAC; a second end of the disable resistor, a cathode of the disable capacitor, and a gate of the disable TRIAC are connected to the first end of the first drive resistor; a first end of the disable resistor, an anode of the disable capacitor, and a main terminal 1 (MT1) of the disable TRIAC are connectable to the ECM; a main terminal 2 (MT2) of the disable TRIAC is connected to the ground.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which:

FIGS. 9A-D are schematics of an alternator overvoltage protection circuit in accordance with an exemplary embodiment of the invention.

Figure 1:
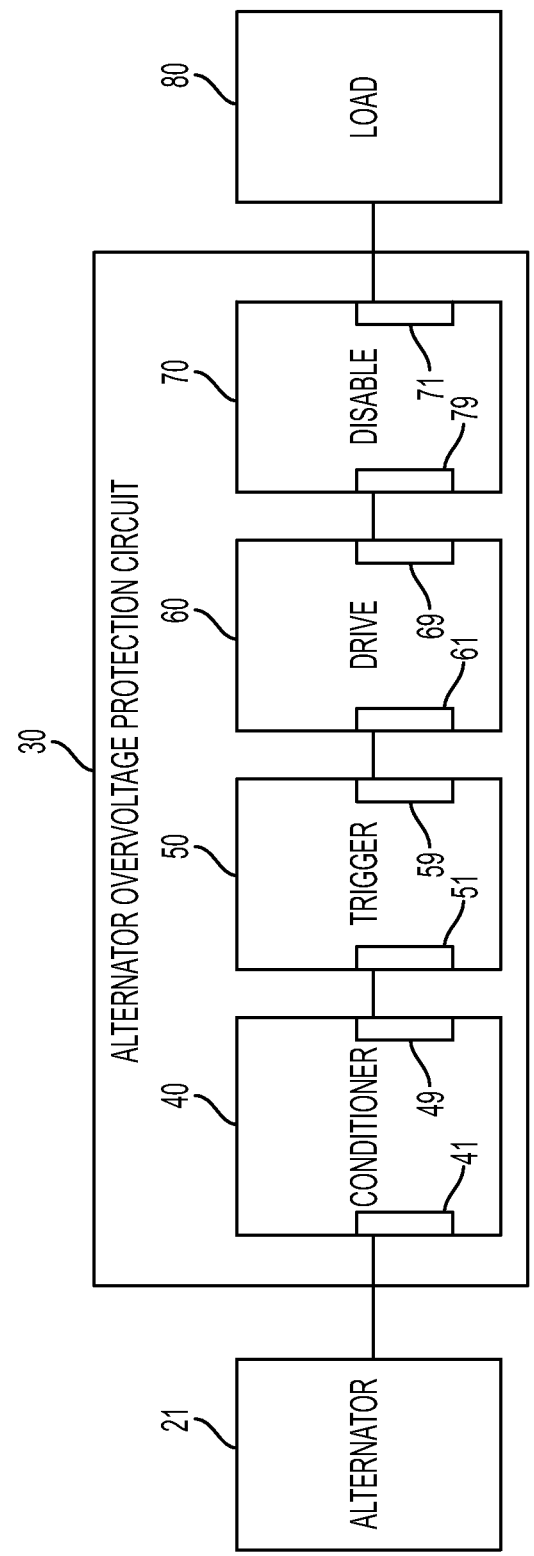
FIG. 1 is a block diagram of an alternator overvoltage protection circuit in accordance with an exemplary embodiment of the invention.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

Referring to FIGS. 1-5, an alternator overvoltage protection circuit 30 for a piece of outdoor power equipment 10 is shown in accordance with an exemplary embodiment. The overvoltage protection circuit 30 is designed to disable the engine 20 of a piece of outdoor power equipment 10 in the event that the voltage output of alternator 21 of engine 20 exceeds a certain threshold voltage. It is contemplated that overvoltage protection circuit 30 can be used with any piece of outdoor power equipment 10 that has an engine 20 with an alternator 21, such as, but not limited to, a riding lawn mower, a zero turn mower, or a garden tractor.

Under typical operating conditions, the voltage output of alternator 21 is typically regulated by battery 90, and charges battery 90 and provides DC voltage to other loads in the range of about 12-15 volts.

Excessive overvoltage of the output of alternator 21 can occur by sudden loss of connection to battery 90. Further, excessive overvoltage of the output of alternator 21 can also occur when a piece of outdoor power equipment 10 with a failed or damaged (e.g. sulfated) battery 90 is jump started from an external source, and the source is then removed after engine 20 is operating, thereby rotating alternator 21, which is outputting voltage that is unable to be regulated by the failed or damaged battery 90.

An excessive overvoltage, overvoltage event, or alternator overvoltage condition is defined as when the output voltage of alternator 21 exceeds an alternator overvoltage threshold. A non-excessive overvoltage, non-overvoltage event, or non-alternator overvoltage condition is defined as when the output voltage of alternator 21 does not exceed an alternator overvoltage threshold.

Referring to FIG. 1, a block diagram of the overvoltage protection circuit 30 in accordance with an exemplary embodiment is shown. The overvoltage protection circuit 30 includes a conditioner section 40, trigger section 50, drive section 60, and disable section 70. In some embodiments, conditioner section 40 has an conditioner section input 41 and a conditioner section output 49, trigger section 50 has a trigger section input 51 and a trigger section output 59, drive section 60 has a drive section input 61 and a drive disable section interface 69, and disable section 70 has a load interface 71 and a disable section output 79.

Conditioner section 40 receives voltage from alternator 21 and the voltage received from alternator 21 is filtered, rectified, and buffered to reduce transients. After the voltage is filtered, rectified, and buffered, it is then passed from the conditioner section 40 to trigger section 50. The trigger section 50 passes current to drive section 60 when the output voltage of alternator 21 exceeds an alternator overvoltage threshold. In one embodiment, the alternator overvoltage threshold is 15 VDC. In another embodiment, the alternator overvoltage threshold is 20 VDC. In yet another embodiment, the alternator overvoltage threshold is 18.65 VDC.

When current is provided to drive section 60 by trigger section 50, drive section 60 activates disable section 70. Disable section 70 draws current away from load 80, thereby disabling load 80. In some embodiments, load 80 is a magneto 22 on engine 20. In other embodiments, load 80 is a coil 23 for a component of engine 20 whose function is necessary for combustion to take place in the engine 20 and the component only allows combustion to take place when voltage is supplied to coil 23, such as a fuel pump relay coil or fuel solenoid coil. For embodiments in which coil 23 is a fuel pump relay coil or a fuel solenoid coil, the delivery of fuel to engine 20 is cut off when voltage is removed from coil 23. Thereby, removing voltage from coil 23 disables engine 20.

Accordingly, when disable section 70 draws current away from load 80, engine 20 stops rotating. Therefore, the voltage output of alternator 21 rotated by engine 20 also ceases, thereby removing the alternator overvoltage condition.

Figure 2:
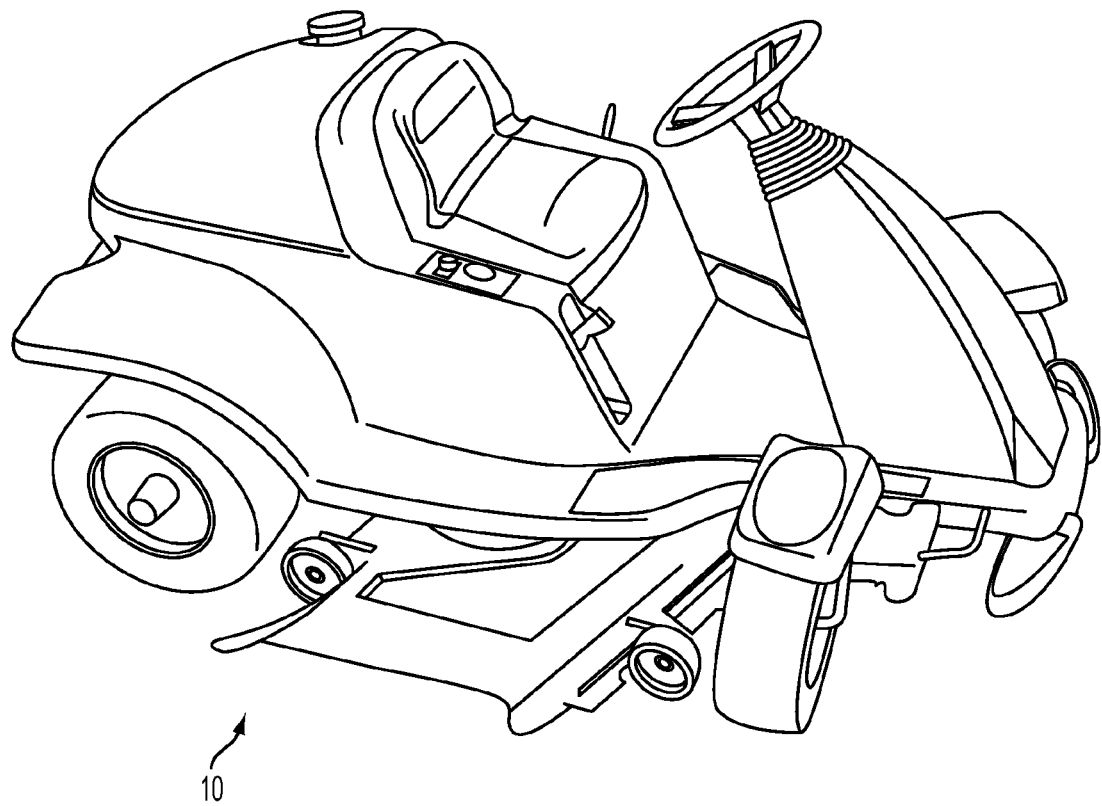
FIG. 2 is a piece of outdoor power equipment in accordance with an exemplary embodiment of the invention.
Figure 3:
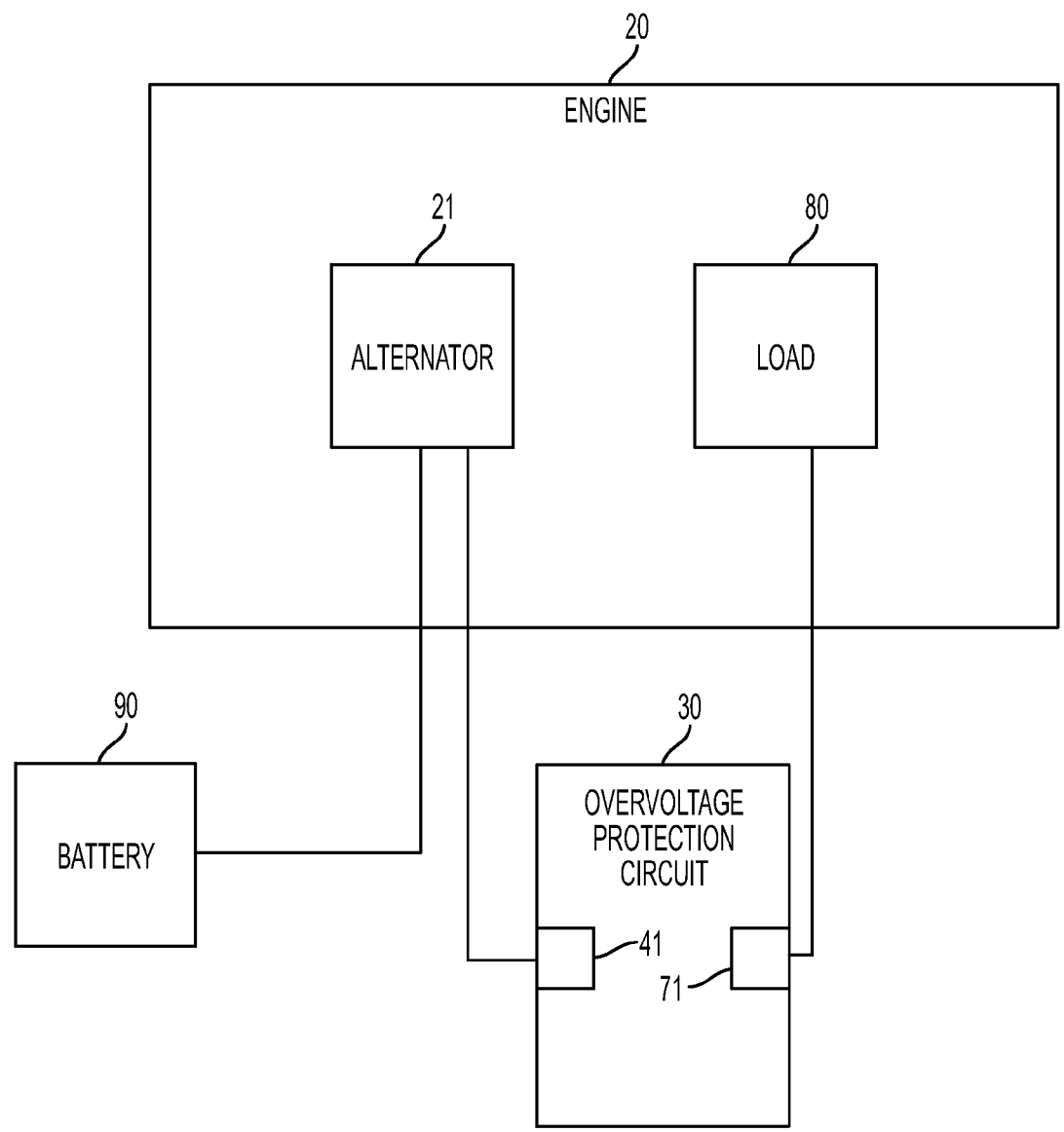
FIGS. 3-5 are block diagrams of an alternator overvoltage protection circuit in a piece of outdoor power equipment in accordance with an exemplary embodiment of the invention.

Referring to FIG. 2, a piece of outdoor power equipment 10 is shown which contains, or is capable of being equipped with an alternator overvoltage protection circuit 30.

Figure 4:
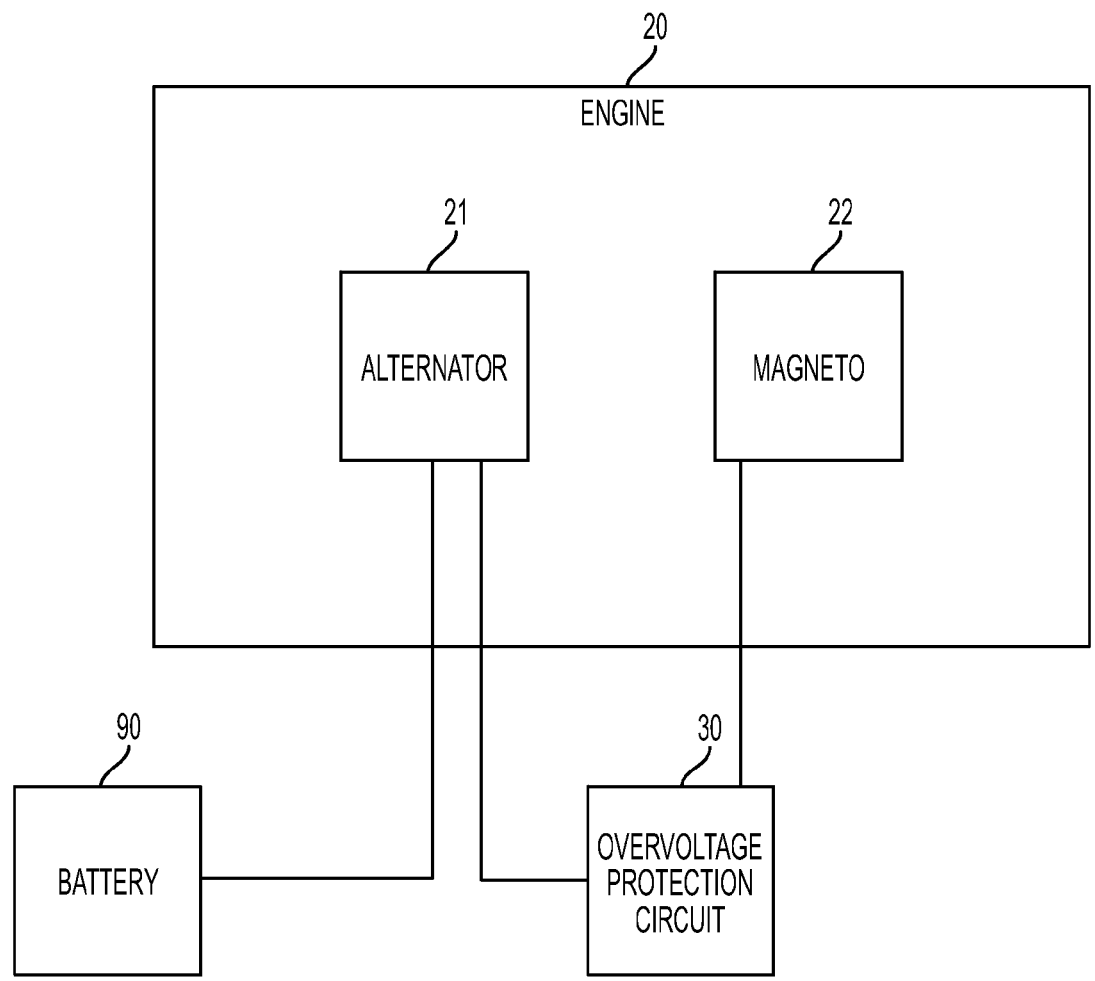
Figure 5:
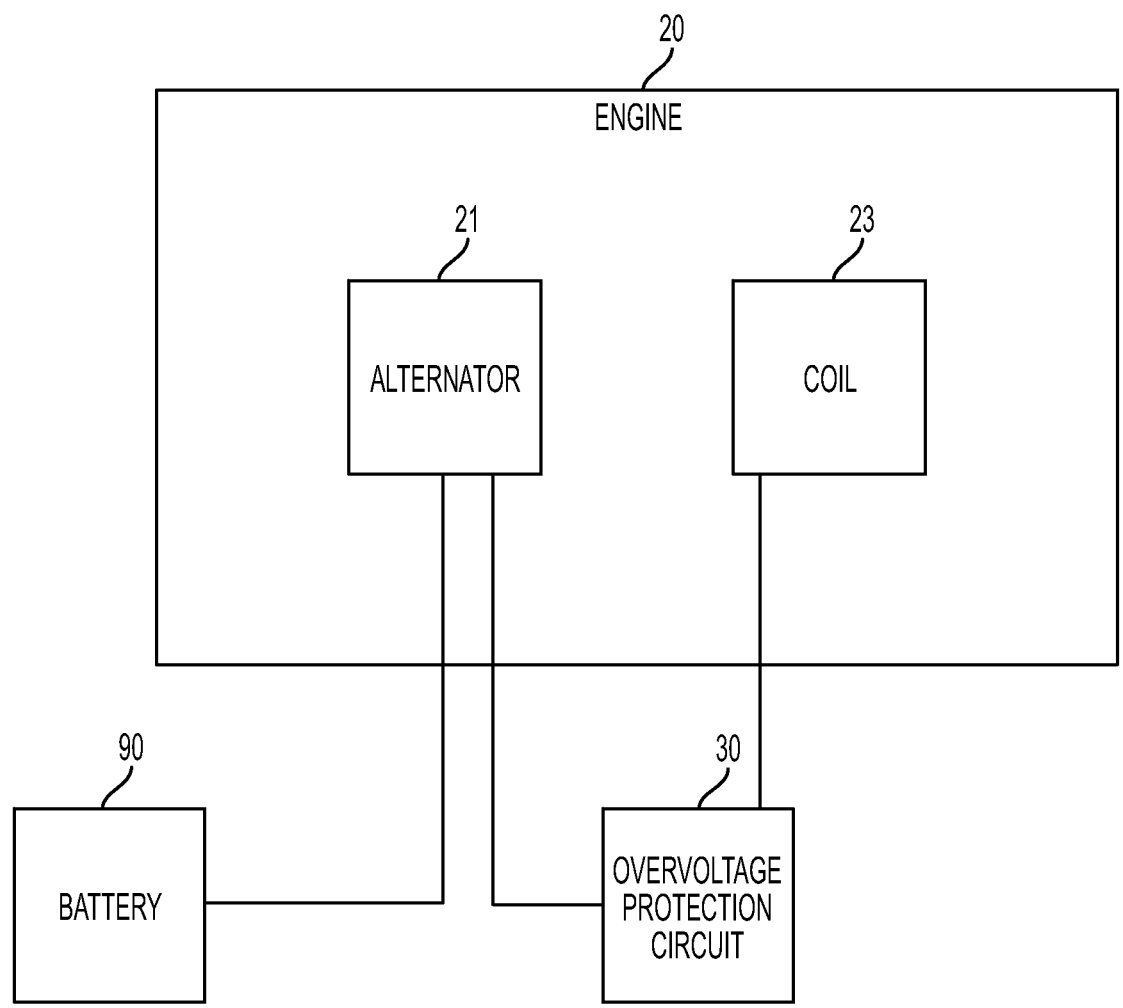
Figure 6A:
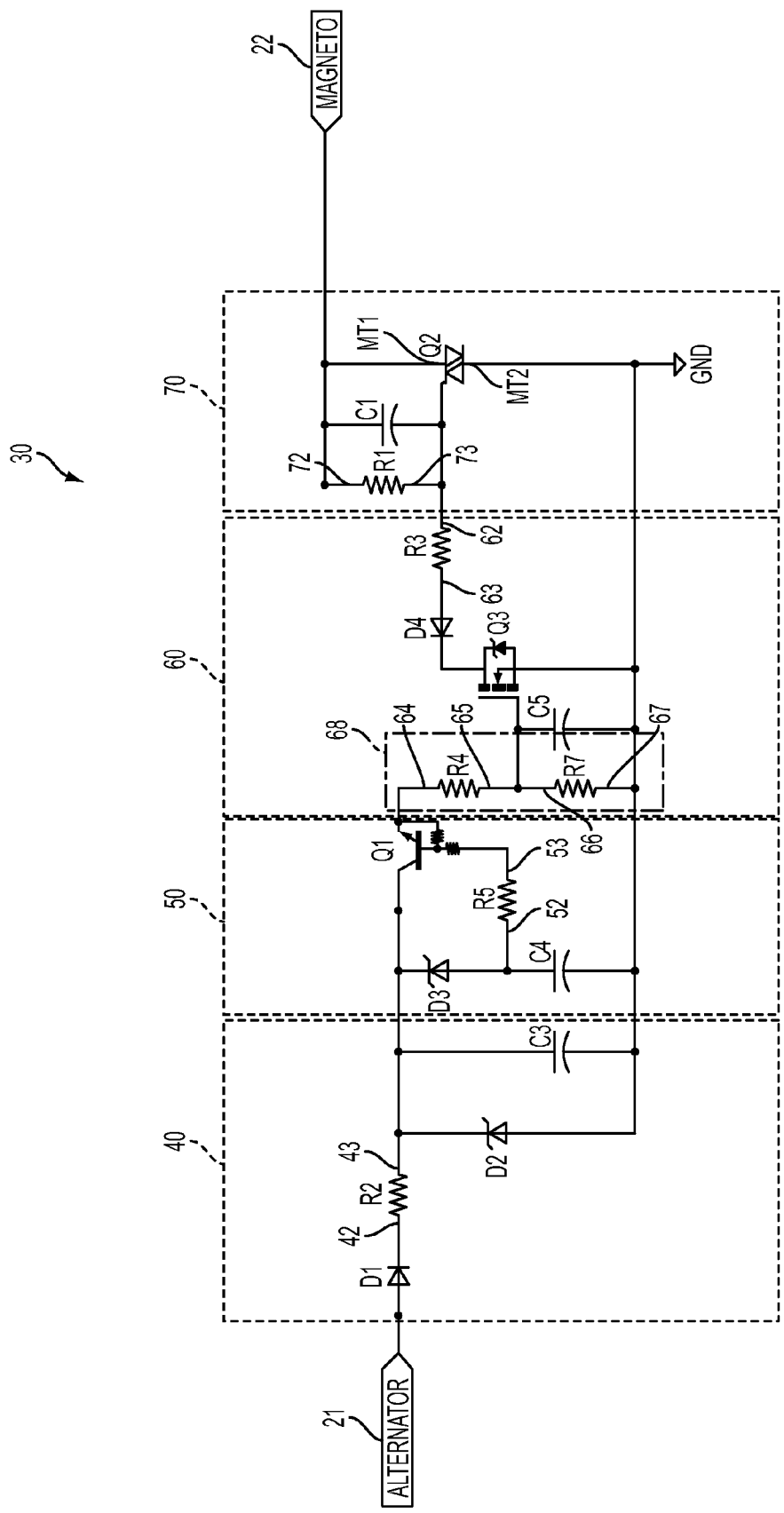
FIGS. 6A-D are schematics of an alternator overvoltage protection circuit in accordance with an exemplary embodiment of the invention.
Figure 6B:
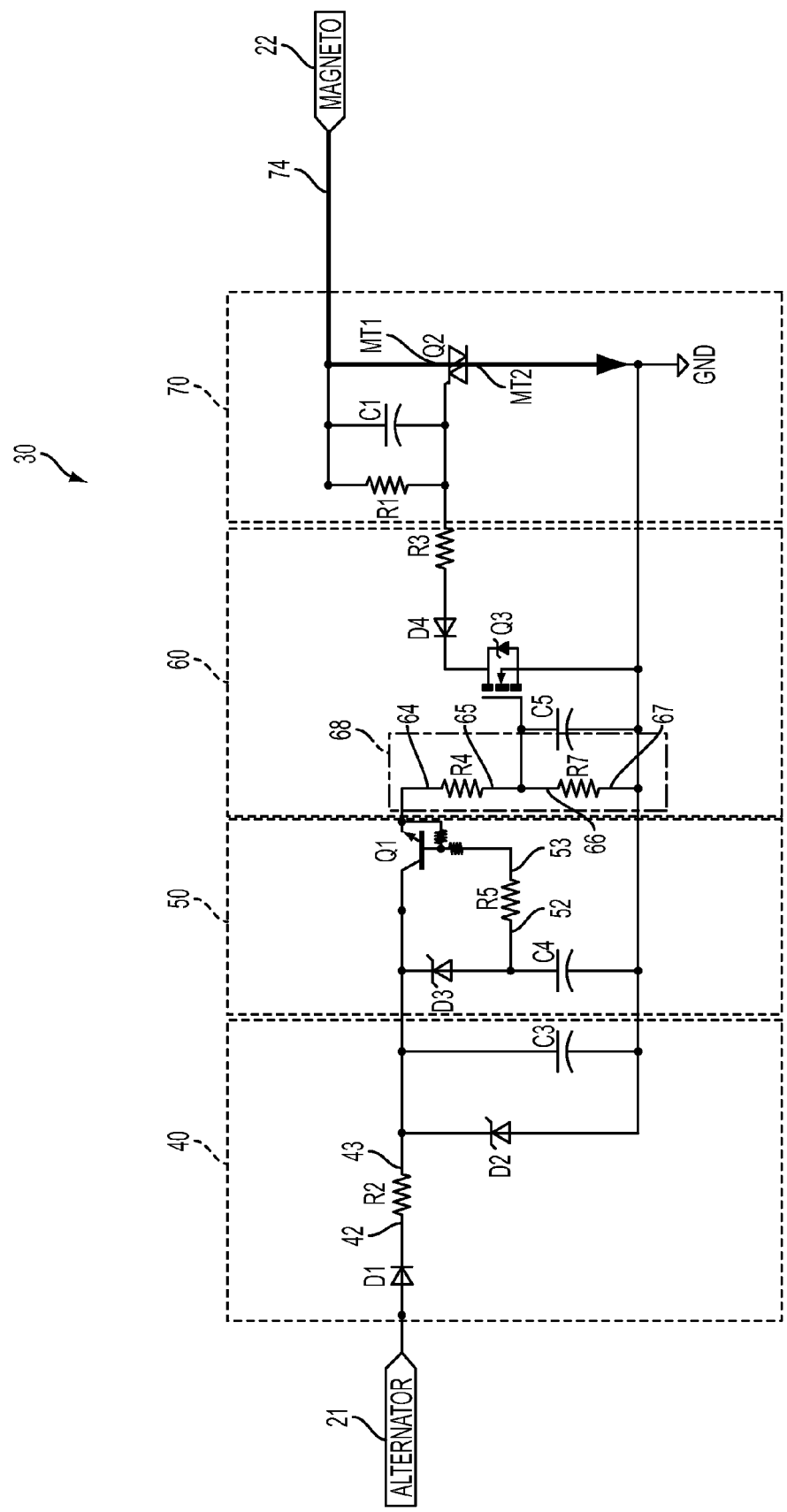
Figure 6C:
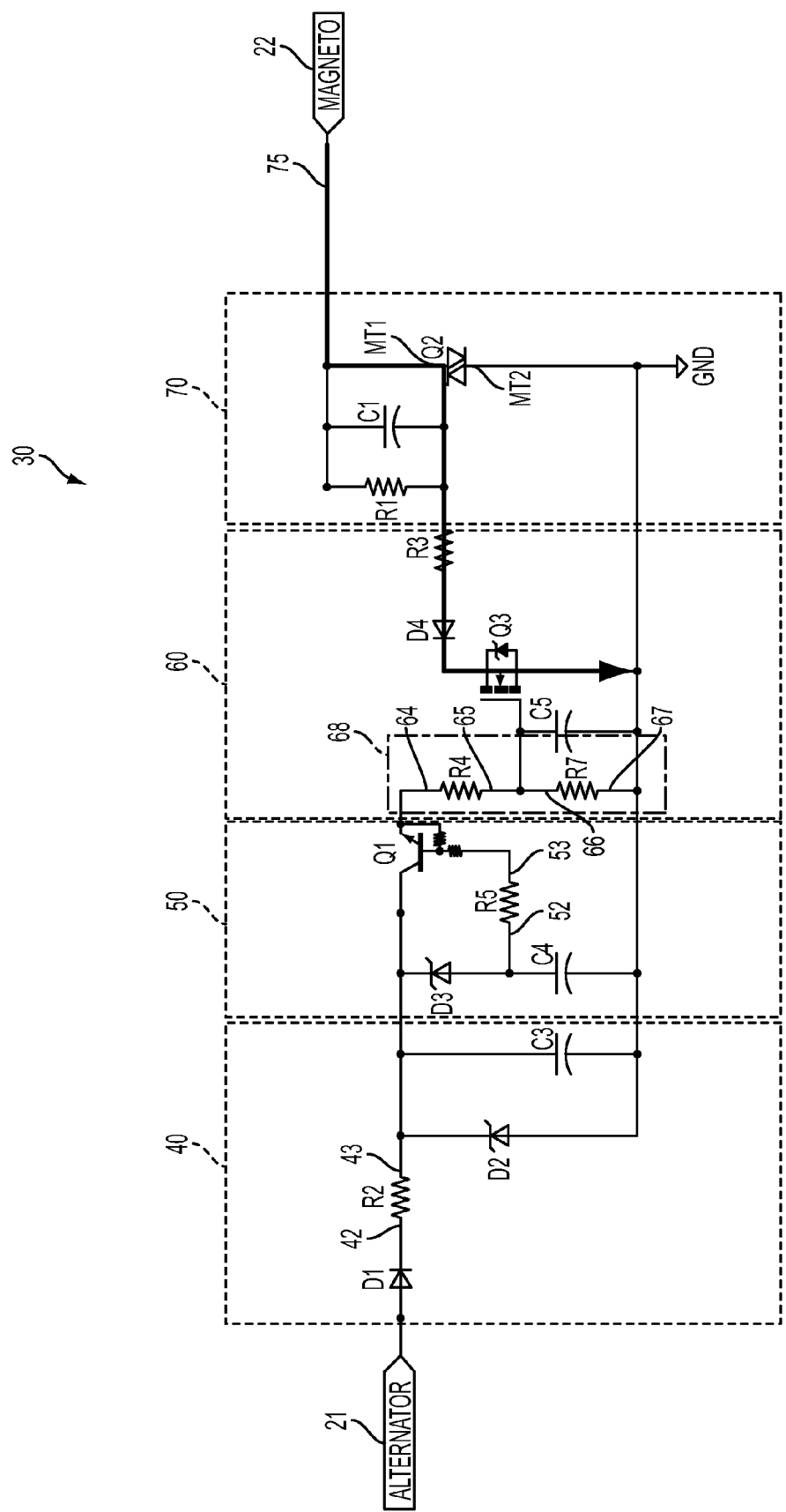
Figure 6D:
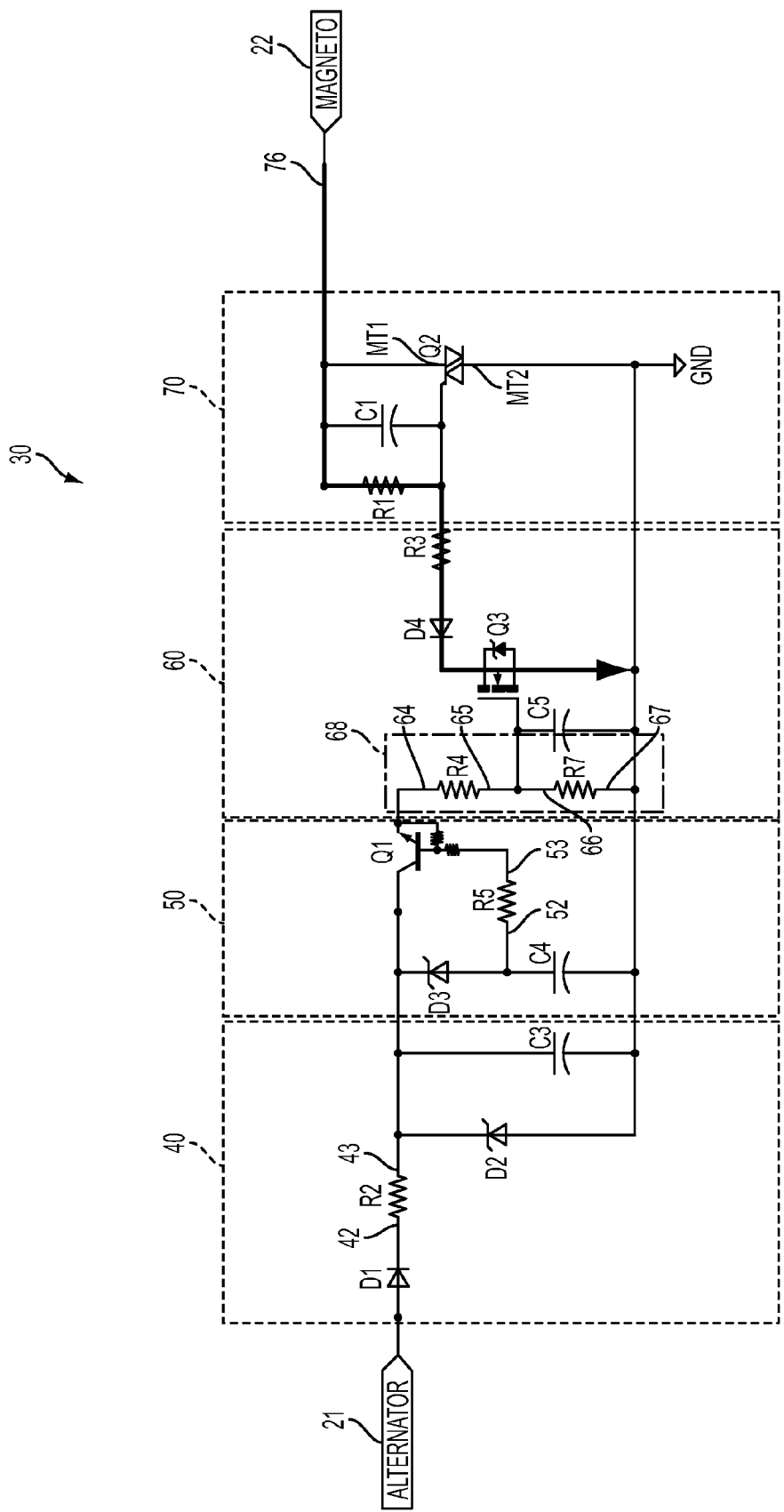
Figure 7A:
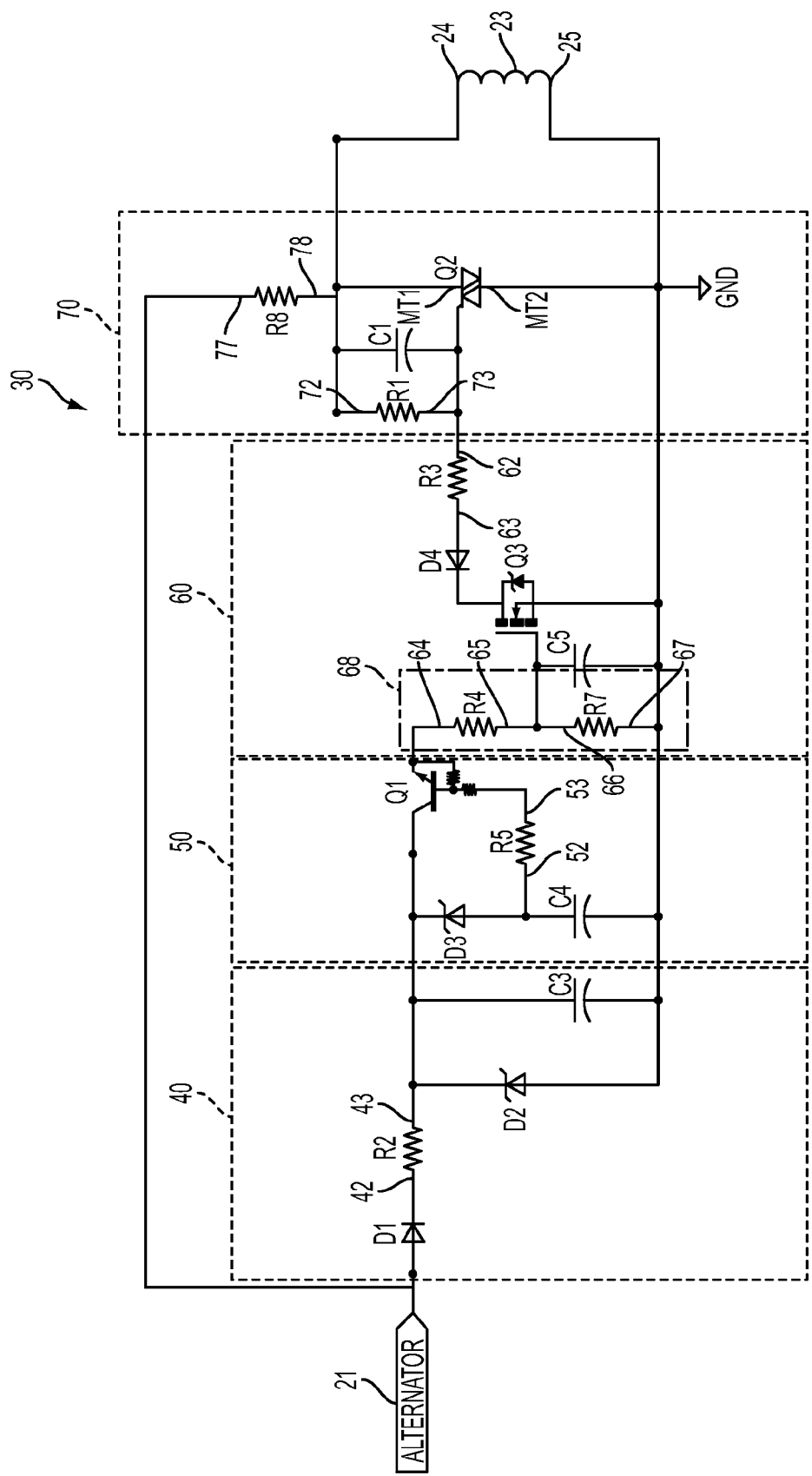
FIGS. 7A-D are schematics of an alternator overvoltage protection circuit in accordance with an exemplary embodiment of the invention.
Figure 7B:
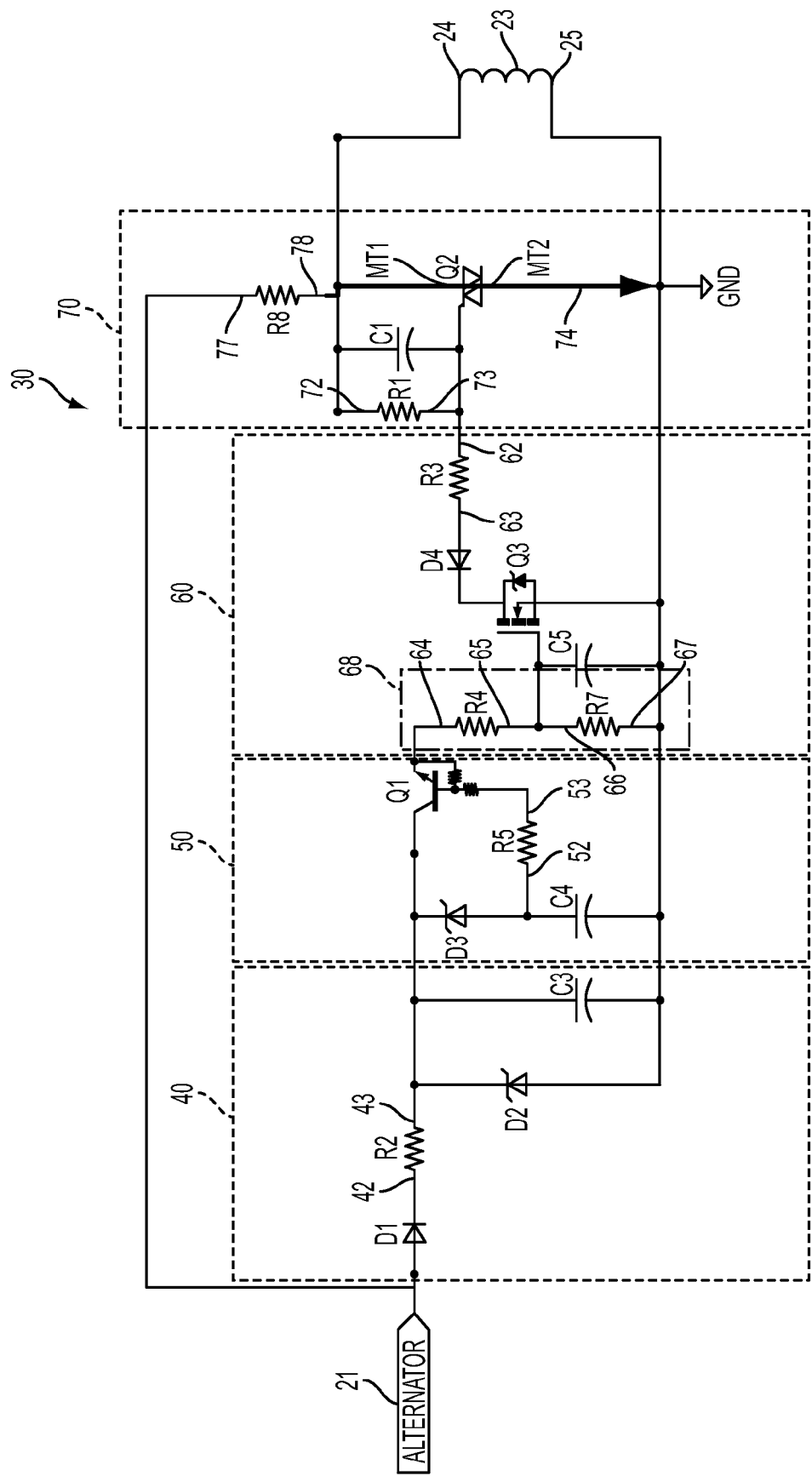
Figure 7C:
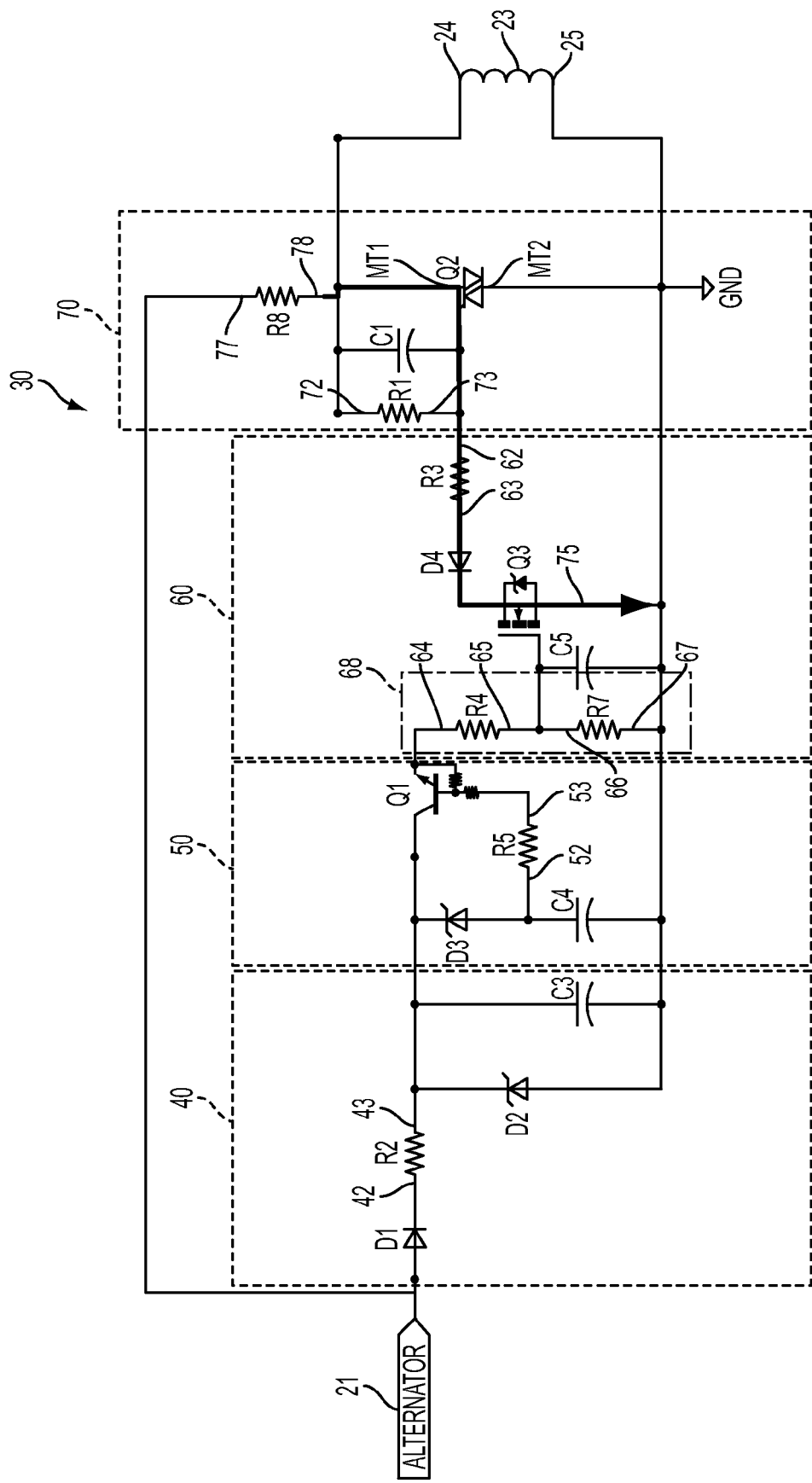
Figure 7D:
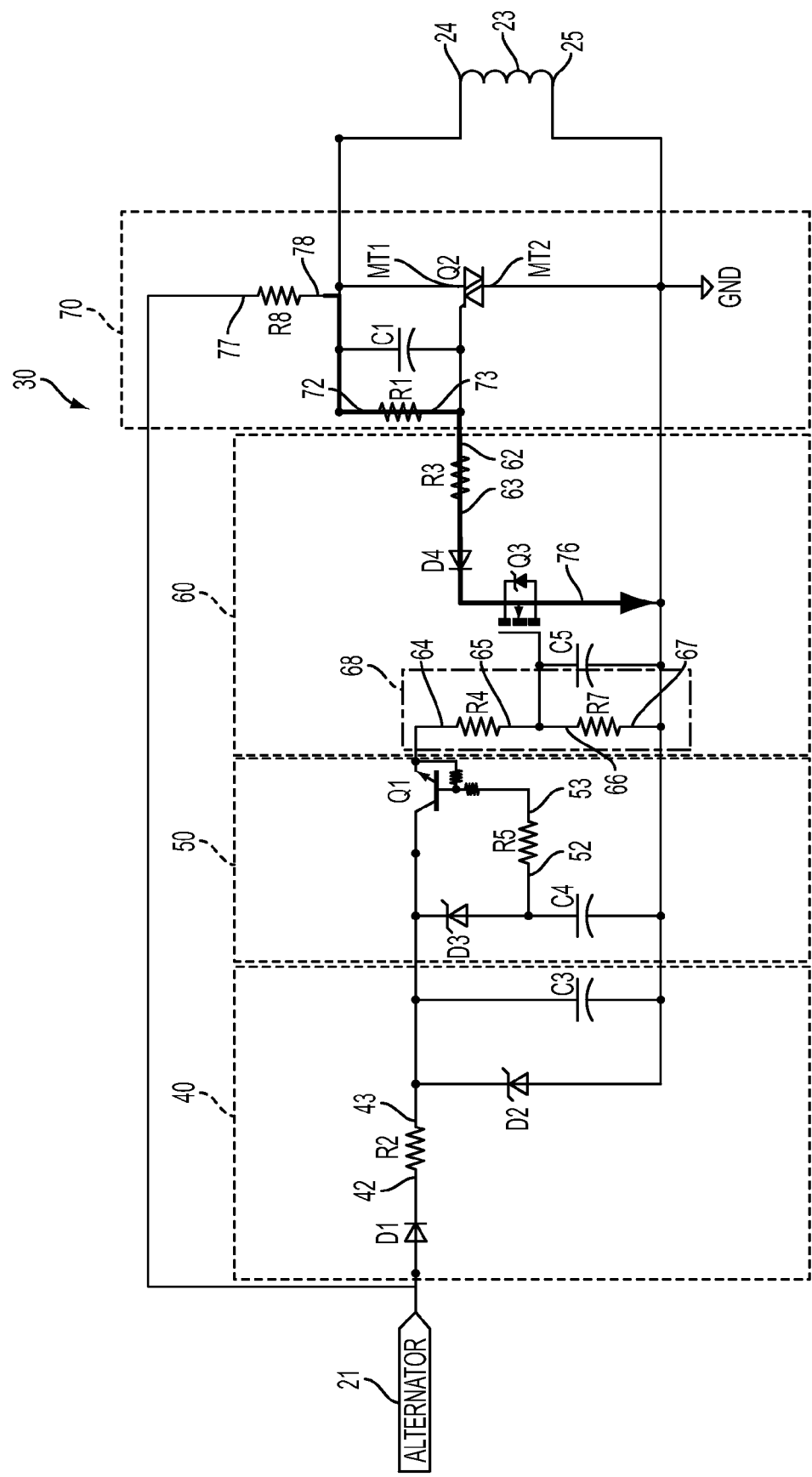
Figure 8:
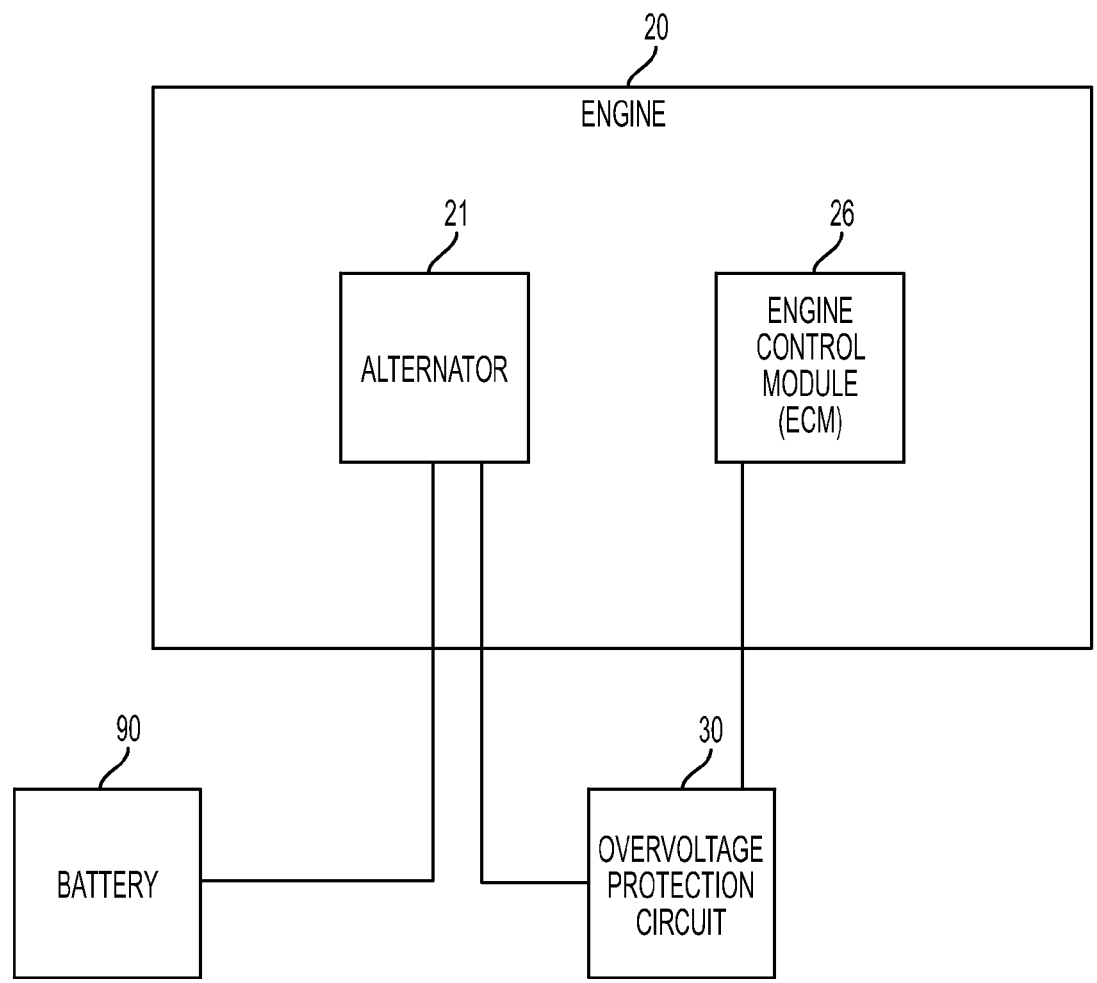
FIG. 8 is a block diagram of an alternator overvoltage protection circuit in a piece of outdoor power equipment in accordance with an exemplary embodiment of the invention.
Figure 9A:
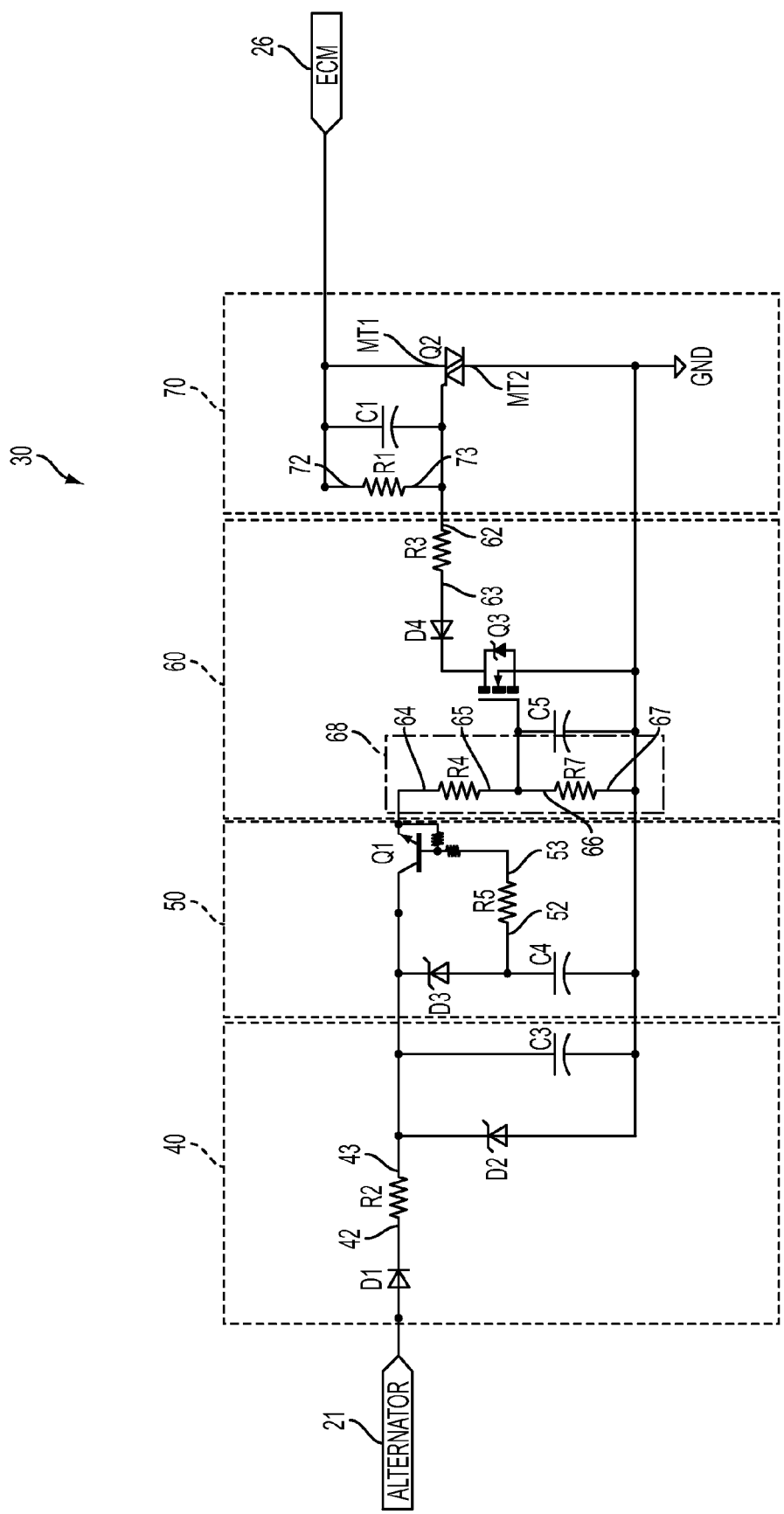
Figure 9B:
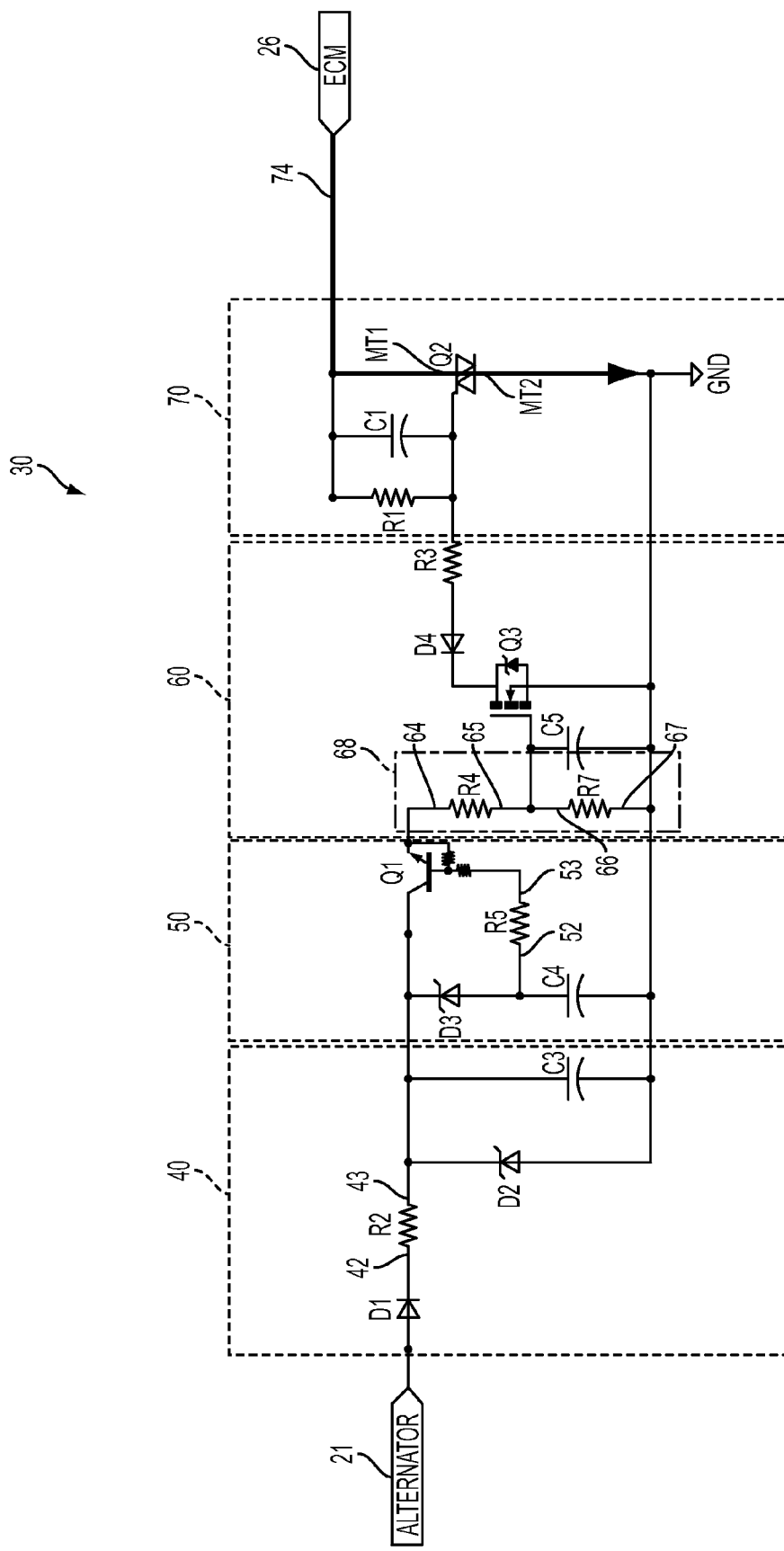
Figure 9C:
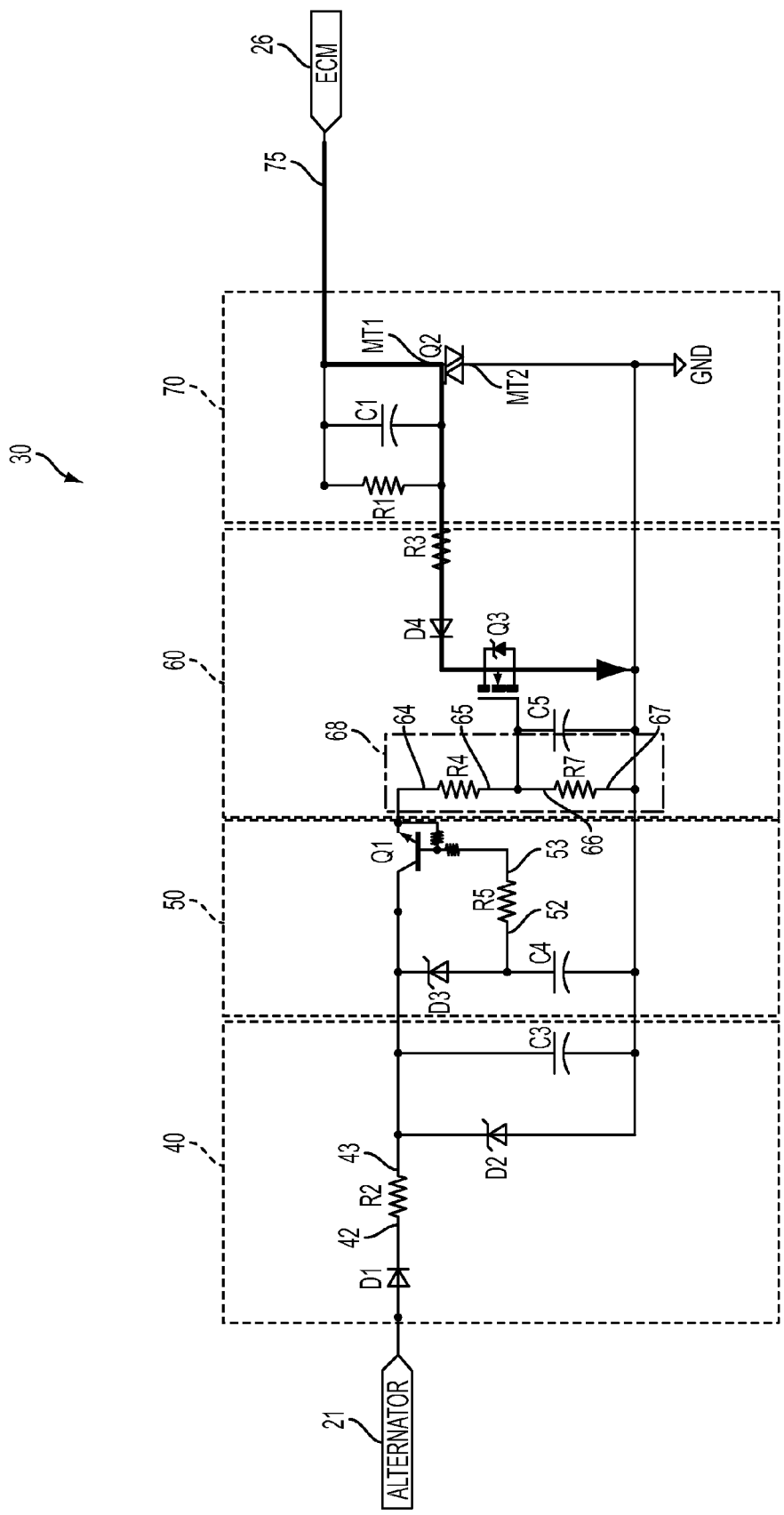

Turning to FIGS. 3-5 and 8, FIG. 3 shows a block diagram of alternator overvoltage protection circuit 30 is shown in relation to battery 90, engine 20 of a piece of outdoor power equipment 10, alternator 21 and load 80 in accordance with an exemplary embodiment. As can be seen, alternator 21 and load 80 are connected to engine 20. Further, overvoltage protection circuit 30 is electrically connected and/or connectable to alternator 21 and load 80. Battery 90 is connected to alternator 21. In some embodiments, conditioner section 40 has an conditioner section input 41 and a conditioner section output 49, trigger section 50 has a trigger section input 51 and a trigger section output 59, drive section 60 has a drive section input 61 and a drive disable section interface 69, and disable section 70 has a load interface 71 and a disable section output 79. As can be seen in FIGS. 4-5 and 8, in some embodiments, load 80 is magneto 22, in further embodiments, load 80 is engine control module 26, and in other embodiments, load 80 is coil 23.

Turning to FIG. 4 discussed above and FIGS. 6A-D, a schematic view of an embodiment of overvoltage protection circuit 30, this embodiment of overvoltage protection circuit 30 is designed to function with a positive pulse magneto 22 as the load 80. As can be seen, the conditioner section 40 includes conditioner section input 41, conditioner diode D1, conditioner resistor R2, conditioner zener diode D2, conditioner capacitor C3, and conditioner section output 49. Conditioner section input 41 connected to the output of alternator 21 and receives voltage output from alternator 21. In some embodiments, the anode of conditioner diode D1 is conditioner section input 41. A first end 42 of conditioner resistor R2 is connected to the cathode of conditioner diode D1. Conditioner zener diode D2 and conditioner capacitor C3 are connected in parallel, with the cathode of conditioner zener diode D2 and the anode of conditioner capacitor C3 being connected to the second end 43 of conditioner resistor R2 and the anode of conditioner zener diode D2 and the cathode of conditioner capacitor C3 being connected to ground.

Conditioner diode D1 rectifies the voltage output of alternator 21 to prevent backflow of current when an overvoltage of alternator 21 occurs and overvoltage protection circuit 30 begins to actively disable engine 20, thereby decreasing the voltage output of alternator 21. Conditioner resistor R2 and conditioner capacitor C3 filter the voltage output of alternator 21 provided to conditioner section 40 to prevent false triggering of trigger section 50, due to short duration transient voltages that may otherwise exceed the alternator overvoltage threshold of the overvoltage protection circuit 30 and disable TRIAC Q2 to conduct and draw current away from load 80. Conditioner zener diode D2 acts as a snubber to clamp an overvoltage condition to protect trigger transistor Q1.

In one embodiment, the conditioner section output 49 is comprised of the second end of conditioner resistor R2, the anode of conditioner capacitor C3, and the cathode of conditioner zener diode D2 and provides conditioned voltage to the trigger section input 51. As can be seen, conditioner section 40 is configured to condition voltage output received from alternator 21, and output conditioned voltage to trigger section 50.

Trigger section 50 includes trigger section input 51, trigger zener diode D3, trigger capacitor C4, trigger resistor R5, trigger transistor Q1, and trigger section output 59. In one embodiment, the cathode of trigger zener diode D3 and the collector of trigger transistor Q1 comprise to trigger section input 51. The anode of trigger zener diode D3, first end 52 of trigger resistor R5 and anode of trigger capacitor C4 are connected. The cathode of trigger capacitor C4 is connected to ground. The second end 53 of trigger resistor R5 is connected to the base of trigger transistor Q1. It is contemplated that in some embodiments, a second base resistor is present between trigger resistor R5 and the base of trigger transistor Q1. Further, it is contemplated that in some embodiments, a resistor is present between the base and emitter of trigger transistor Q1.

In operation, when the alternator overvoltage threshold is exceeded by the output voltage of alternator 21, trigger zener diode D3 becomes reverse biased and causes trigger capacitor C4 to charge. When trigger capacitor C4, trigger transistor Q1 begins to conduct and amplifies the current passing through trigger zener diode D3. In one embodiment, trigger transistor Q1 begins to conduct when trigger capacitor C4 is charged to 0.65V. It is contemplated that in some embodiments, trigger transistor Q1 can be a PNP transistor, and in other embodiments, trigger transistor Q1 can be an NPN transistor. This amplified current passes through the collector of trigger transistor Q1 to drive section 60. In one embodiment, the emitter of trigger transistor Q1 comprises trigger section output 59.

Drive section 60 includes drive section input 61, drive disable section interface 69, first drive resistor R3, second drive resistor R4, third drive resistor R7, drive capacitor C5, drive diode D4, and drive metal-oxide-semiconductor field-effect-transistor (MOSFET) Q3. Drive MOSFET Q3 is an N-channel MOSFET. In one embodiment, the first end 64 of second drive resistor R4 comprises drive section input 61. The second end 67 of third drive resistor R7 is connected to ground. Second end 65 of second drive resistor R4 and first end 66 of third drive resistor R7 are connected. Accordingly, second drive resistor R4 and third drive resistor R7 act as a drive voltage divider 68 between drive section input 61 and ground. Further, the anode of drive capacitor C5 is connected to second end 65 of second drive resistor R4, first end 66 of third drive resistor R7, and gate of drive MOSFET Q3. The source of drive MOSFET Q3 is connected to ground and the drain of drive MOSFET Q3 is connected to the cathode of drive diode D4. The anode of drive diode D4 is connected to a second end 63 of first drive resistor R3. In one embodiment, the first end 62 of first drive resistor R3 comprises the drive disable section interface 69 that receives current from disable section output 79 of disable section 70.

The embodiment of disable section 70 shown in FIGS. 6A-D has a load interface 71, disable section output 79, disable resistor R1, disable capacitor C1, and disable triode for alternating current (TRIAC) Q2. In this embodiment, disable section output 79 sends current to drive disable section interface 69 of drive section 60. In one embodiment, the second end 73 of disable resistor R1, cathode of disable capacitor C1, and gate of disable TRIAC Q2 are connected to comprise disable section output 79. In one embodiment, the first end 72 of disable resistor R1, anode of disable capacitor C1, and main terminal 1 (MT1) of disable TRIAC Q2 are connected to comprise load interface 71, which is connected to and receives power from magneto 22. Main terminal 2 (MT2) of disable TRIAC Q2 is connected to ground. Disable capacitor C1 filters transients to prevent false triggering of the gate of disable TRIAC Q2.

In operation, the current travelling through and exiting the emitter of trigger transistor Q1 imposes a voltage at gate of drive MOSFET Q3. More specifically, the current travelling through and exiting the emitter of trigger transistor Q1 travels through the drive voltage divider 68 comprised of second drive resistor R4 and third drive resistor R7. Drive voltage divider 68 imposes a voltage at the high impedance gate of drive MOSFET Q3 sufficient to cause drive MOSFET Q3 to conduct. Gate of drive MOSFET Q3 is located between second drive resistor R4 and third drive resistor R7.

Drive MOSFET Q3 normally has a high impedance path between drain and source, which does not allow current to pass between the drain and source of drive MOSFET Q3. However, when sufficient voltage is applied to gate of drive MOSFET Q3, the impedance of the path between drain and source becomes low, thereby allowing a third portion of the current generated by magneto 22 to be directed or diverted away from magneto 22 and flow along third current path 76 when magneto 22 produces a positive pulse. Third current path 76 is comprised of disable resistor R1, first drive resistor R3, dive diode D4, and drive MOSFET Q3. Further, disable resistor R1 and first drive resistor R3 of third current path 76 form a third current path voltage divider, with the gate of disable TRIAC Q2 connected between disable resistor R1 and first drive resistor R3. It can be seen that a node is formed by the second end 73 of disable resistor R1, first end 62 of first drive resistor R3, gate of disable TRIAC Q2, and cathode of disable capacitor C1.

Disable TRIAC Q2 is normally a high impedance path between terminal MT1 and MT2 when not triggered and not conducting. However, disable TRIAC Q2 acts as a low impedance path between MT1 and MT2 when triggered and conducting, thereby grounding current produced by magneto 22. Accordingly, when a third portion of the current generated by a positive voltage pulse of magneto 22 flows along third current path 76, a voltage is produced at the gate of disable TRIAC Q2 sufficient to trigger the gate of disable TRIAC Q2. Further, the voltage produced at the gate of disable TRIAC Q2 is less than the voltage at MT1 of disable TRIAC Q2, due to third current path voltage divider formed by disable resistor R1 and drive resistor R3, and the voltage at grounded MT2 of disable TRIAC Q2 is less than the voltage at gate and MT1 of disable TRIAC Q2, which results in disable TRIAC Q2 conducting in quadrant 3.

When disable TRIAC Q2 conducts in quadrant 3, a second portion of current travels along a second current path 75 from magneto 22 to ground. The second current path 75 from magneto 22 to ground is comprised disable TRIAC Q2, first drive resistor R3, drive diode D4, and drive MOSFET Q3. Current travelling along the second current path 75 exits magneto 22, enters disable TRIAC Q2 at MT1, exits disable TRIAC Q2 at gate, travels through first drive resistor R3 and drive diode D4, enters the drain of drive MOSFET Q3, and exits from the source of drive MOSFET Q3 to ground.

Current travelling along second current path 75 through disable TRIAC Q2 from MT1 to gate while disable TRIAC Q2 is operating in quadrant 3 causes disable TRIAC Q2 to conduct, thereby creating a first current path 74 from magneto 22 to ground for a first portion of current from magneto 22. First current path 74 from magneto 22 to ground is comprised of disable TRIAC Q2. Current travelling along the first current path 74 exits magneto 22, enters disable TRIAC Q2 at MT1, and exits MT2 of disable TRIAC Q2 at MT2 to ground. It is understood that when disable TRIAC Q2 is conducting, only a small amount of current produced by magneto 22 travels along third current path 76 and second current path 75, while the majority of the current produced by magneto 22 travels along the first current path 74, which is a low impedance path from magneto 22 to ground through conducting disable TRIAC Q2.

Removing current from magneto 22 through first current path 74 using disable TRIAC Q2 removes current from the circuit of magneto 22, thereby disabling the source of spark for engine 20 and stopping engine 20 of outdoor power equipment 10. Because drive MOSFET Q3 has a high input resistance, once disable TRIAC Q2 begins conducting, disable TRIAC Q2 remains in a state of continuous conduction for sufficient duration to disable engine 20.

As can be seen, while engine 20 is stopping, the output of alternator 21 is reduced and disable TRIAC Q2 is held in low impendence until the charge in drive capacitor C5 is discharged through third drive resistor R7, which causes the voltage at the gate of drive MOSFET Q3 to fall below the threshold voltage of drive MOSFET Q3 and drive MOSFET Q3 stops conducting.

In one embodiment, the charge on drive capacitor C5 falls below the threshold voltage of drive MOSET Q3 a few seconds after engine 20 stops rotating.

Stated alternatively, an alternator overvoltage protection circuit 30 comprises a TRIAC and a MOSFET, wherein TRIAC is disable TRIAC Q2 and MOSFET is drive MOSFET Q3. The TRIAC is electrically connected to the MOSFET and the TRIAC is electrically connected to magneto 22. The TRIAC is configured to ground the magneto 22 when triggered by the MOSFET. Further, the MOSFET is electrically connected to alternator 21. The MOSFET is configured to conduct when the alternator operates in an overvoltage condition such as when the output voltage of alternator 21 exceeds an alternator overvoltage threshold.

Further, alternator 21 is connected to and rotated by engine 20. Additionally, the magneto 22 is connected to and provides spark to the engine 20. Accordingly, grounding the magneto 22 with the TRIAC disables the magneto 22 and stops the voltage output from the alternator 21.

In some embodiments, the alternator overvoltage protection circuit 30 further comprises a transistor, wherein the transistor is trigger transistor Q1. The transistor is electrically connected to the alternator 21 and configured to conduct when the alternator 21 operates in the overvoltage condition.

Turning to FIG. 5 discussed above and FIGS. 7A-D, a schematic view of another embodiment of overvoltage protection circuit 30, this embodiment of overvoltage protection circuit 30 is designed to function with a coil 23 as the load 80. In some embodiments, coil 23 is a fuel pump relay coil for the fuel pump providing fuel to engine 20 of outdoor power equipment 10. In other embodiments, coil 23 is the fuel solenoid coil for the fuel solenoid providing fuel to engine 20 of outdoor power equipment 10. In further embodiments, coil 23 is an air intake valve coil for the air intake providing air to engine 20 of outdoor power equipment 10. However, it is contemplated that the coil 23 can be the coil of any component of outdoor power equipment 10 that will disable the combustion in engine 20 when voltage is removed from coil 23, which will disable the output of alternator 21 of outdoor power equipment 10. Further, it is contemplated that the coil 23 can be the coil of any component of outdoor power equipment 10 that will disable the combustion in engine 20 when coil 23 is shorted or grounded by disable TRIAC Q2, thereby disabling the output of alternator 21 of outdoor power equipment 10.

The conditioner section 40, trigger section 50, and drive section 60 contain the same components and are designed to function in the same manner as described in conjunction with FIG. 4 and FIGS. 6A-D above. However, the configuration and functionality of disable section 70 differs between the embodiments shown in FIG. 4 and FIGS. 6A-D as compared to FIG. 5 and FIGS. 7A-D.

The embodiment of disable section 70 shown in FIG. 5 and FIGS. 7A-D have a load interface 71, disable section output 79, disable resistor R1, disable capacitor C1, disable TRIAC Q2, and a disable resistive element R8. Load interface 71 connects load 80 to disable section 70. In this embodiment, load 80 is in the form of coil 23.

A first end 77 of disable resistive element R8 is connected to the output of alternator 21 and receives voltage from alternator 21. A second end 78 of disable resistive element R8 is connected to MT1 of disable TRIAC Q2, anode of disable capacitor C1, and a first end 72 of disable resistor R1. Further, a second end 78 of disable resistive element R8 is connected to a first end 24 of coil 23, accordingly, coil 23 receives power from alternator 21 through disable resistive element R8. Second end 25 of coil 23 is connected to ground.

Further, in this embodiment, disable section output 79 sends current to drive disable section interface 69 of drive section 60. In one embodiment, the second end 73 of disable resistor R1, cathode of disable capacitor C1, and gate of disable TRIAC Q2 are connected to comprise disable section output 79. Main terminal 2 (MT2) of disable TRIAC Q2 is connected to ground. Disable capacitor C1 filters transients to prevent false triggering of the gate of disable TRIAC Q2. In one embodiment, the first end 72 of disable resistor R1, anode of disable capacitor C1, second end 78 of disable resistive element R8 and main terminal 1 (MT1) of disable TRIAC Q2 are connected to comprise load interface 71, which is connected to and provides power to a first end 24 of coil 23.

In operation, the current travelling through and exiting the emitter of trigger transistor Q1 imposes a voltage at gate of drive MOSFET Q3. More specifically, the current travelling through and exiting the emitter of trigger transistor Q1 travels through the drive voltage divider 68 comprised of second drive resistor R4 and third drive resistor R7. Drive voltage divider 68 imposes a voltage at the high impedance gate of drive MOSFET Q3 sufficient to cause drive MOSFET Q3 to conduct. Gate of drive MOSFET Q3 is located between second drive resistor R4 and third drive resistor R7.

Drive MOSFET Q3 normally has a high impedance path between drain and source, which does not allow current to pass between the drain and source of drive MOSFET Q3. However, when sufficient voltage is applied to gate of drive MOSFET Q3, the impedance of the path between drain and source becomes low, thereby allowing a third portion of the current flowing through disable resistive element R8 to be diverted or directed away from coil 23 and flow along third current path 76. Third current path 76 is comprised of disable resistor R1, first drive resistor R3, drive diode D4, and drive MOSFET Q3. Further, disable resistor R1 and first drive resistor R3 of third current path 76 form a third current path voltage divider, with the gate of disable TRIAC Q2 connected between disable resistor R1 and first drive resistor R3. It can be seen that a node is formed by the second end 73 of disable resistor R1, first end 62 of first drive resistor R3, gate of disable TRIAC Q2, and cathode of disable capacitor C1.

Disable TRIAC Q2 is normally a high impedance path between terminal MT1 and MT2 when not triggered and not conducting. However, disable TRIAC Q2 acts as a low impedance path between MT1 and MT2 when triggered and conducting, thereby sending to ground current provided through disable resistive element R8, and originally intended to flow through coil 23. Accordingly, when a third portion of the current delivered through disable resistive element R8 flows along third current path 76, a voltage is produced at the gate of disable TRIAC Q2 sufficient to trigger the gate of disable TRIAC Q2. Further, the voltage produced at the gate of disable TRIAC Q2 is less than the voltage at MT1 of disable TRIAC Q2, due to third current path voltage divider formed by disable resistor R1 and first drive resistor R3, and the voltage at grounded MT2 of disable TRIAC Q2 is less than the voltage at gate and MT1 of disable TRIAC Q2, which results in disable TRIAC Q2 conducting in quadrant 3.

When disable TRIAC Q2 conducts in quadrant 3, a second portion of current is directed or diverted away from coil 23 and travels along a second current path 75 from disable resistive element R8 to ground. The second current path 75 from disable resistive element R8 to ground is comprised disable TRIAC Q2, first drive resistor R3, drive diode D4, and drive MOSFET Q3. Current travelling along the second current path 75 exits disable resistive element R8, enters disable TRIAC Q2 at MT1, exits disable TRIAC Q2 at gate, travels through first drive resistor R3 and drive diode D4, enters the drain of drive MOSFET Q3, and exits the source of drive MOSFET Q3 to ground.

Current travelling along second current path 75 through disable TRIAC Q2 from MT1 to gate while operating in quadrant 3 causes disable TRIAC Q2 to conduct, thereby creating a first current path 74 from disable resistive element R8 to ground for a first portion of current directed or diverted away from coil 23. First current path 74 from disable resistive element R8 to ground is comprised of disable TRIAC Q2. Current travelling along the first current path 74 exits disable resistive element R8, enters disable TRIAC Q2 at MT1, and exits MT2 of disable TRIAC Q2 at MT2 to ground. As can be seen, first current path 74 is in parallel with coil 23. It is understood that when disable TRIAC Q2 is conducting, only a small amount of current delivered by disable resistive element R8 travels along third current path 76 and second current path 75, while the majority of the current delivered through disable resistive element R8 travels along the first current path 74, which is a low impedance path from disable resistive element R8 to ground through conducting disable TRIAC Q2. Also, it is understood that in some embodiments, a small amount of current may continue to flow through coil 23 while current is flowing through the third current path 76, second current path 75, and first current path 74.

As one can see, the first current path 74 is a low impedance path from disable resistive element R8 to ground through conducting disable TRIAC Q2. When first current path 74 is active during an alternator overvoltage event the amount of current flowing through disable resistive element R8 is greatly increased, when compared to the amount of current flowing through disable resistive element R8 during a non-overvoltage event when first current path 74 is not active. Stated alternatively, when disable TRIAC Q2 is conducting during an alternator overvoltage event the amount of current flowing through disable resistive element R8 is greatly increased, when compared to the amount of current flowing through disable resistive element R8 during a non-overvoltage event when disable TRIAC Q2 is not conducting.

In some embodiments, disable resistive element R8 is a fuse. In other embodiments, disable resistive element R8 is a resistor. In further embodiments, disable resistive element R8 is a fuse and a resistor in series. Stated alternatively, disable resistive element R8 is comprised of at least one of a fuse and/or resistor.

In embodiments in which disable resistive element R8 is comprised of a fuse, the fuse is sized such that the fuse remains intact during a normal operation of alternator 21, such as during an alternator non-overvoltage condition of outdoor power equipment 10. However, in the event of an alternator overvoltage condition, fuse of disable resistive element R8 is sized to blow and interrupt the flow of current through disable resistive element R8 when disable TRIAC Q2 begins conducting (the first current path 74 is active). When the flow of current through disable resistive element R8 is interrupted by the fuse blowing when disable TRIAC Q2 conducts, the delivery of power to coil 23 is also interrupted, thereby disabling engine 20, which will stop the voltage output of alternator 21 which is rotated by engine 20. It is contemplated that in some embodiments, fuse of disable resistive element R8 is a non-resettable fuse.

It is contemplated that in some embodiments, the fuse of disable resistive element R8 may be a resettable fuse that interrupts the delivery of power to coil 23 for a sufficient length of time to disable engine 20, which will stop the voltage output of alternator 21 which is rotated by engine 20. Thereby, stopping the output of alternator 21 removes the alternator overvoltage condition.

As was stated above, while engine 20 is stopping, the output of alternator 21 is reduced and disable TRIAC Q2 is held in low impendence until the charge in drive capacitor C5 is discharged through third drive resistor R7, which causes the voltage at the gate of drive MOSFET Q3 to fall below the threshold voltage of drive MOSFET Q3 and drive MOSFET Q3 stops conducting.

In one embodiment, the charge on drive capacitor C5 falls below the threshold voltage of drive MOSET Q3 a few seconds after engine 20 stops rotating.

In embodiments in which a fuse is not present in disable resistive element R8, such as when only a resistor is present, the value of the resistance of disable resistive element R8 is such that coil 23 is provided with sufficient voltage during normal operation of alternator, such as during an alternator non-overvoltage condition of outdoor power equipment 10. However, the value of the resistance of the resistor in disable resistive element R8 is high enough that in the event of an alternator overvoltage condition, coil 23 drops out due to an insufficient voltage drop across coil 23 when disable TRIAC Q2 begins conducting (the first current path 74 is active). When the disable TRIAC Q2 is conducting, a coil dropout voltage divider 82 is formed in which disable resistive element R8 acts as the upper resistor 83 in a coil dropout voltage divider and elements of third current path 76, second current path 75, first current path 74, and coil 23 acts in parallel as the lower resistor 84 of the coil dropout voltage divider.

As was stated above, while engine 20 is stopping, the output of alternator 21 is reduced and disable TRIAC Q2 is held in low impendence until the charge in drive capacitor C5 is discharged through third drive resistor R7, which causes the voltage at the gate of drive MOSFET Q3 to fall below the threshold voltage of drive MOSFET Q3 and drive MOSFET Q3 stops conducting.

In one embodiment, the charge on drive capacitor C5 falls below the threshold voltage of drive MOSET Q3 a few seconds after engine 20 stops rotating.

Turning to FIG. 8 discussed above and FIGS. 9A-D, a schematic view of another embodiment of overvoltage protection circuit 30, this embodiment of overvoltage protection circuit 30 is designed to function with an ECM 26 having a "kill pin" as the load 80. When the kill pin of ECM 26 is grounded through disable TRIAC Q2, the ECM disables the operation of engine 20. In some embodiments, ECM 26 is an electronic fuel injection module which controls the providing of fuel to engine 20 of outdoor power equipment 10. In other embodiments, ECM 26 is a digital spark advance module which controls the spark provided to engine 20 of outdoor power equipment 10. However, it is contemplated that the ECM 26 can be any module that controls the operation of engine 20 and has a "kill pin" that will provide sufficient voltage to trigger and cause disable TRIAC Q2 to conduct, and disable the operation of engine 20 when kill pin of ECM 26 is grounded by conducting disable TRIAC Q2, which will disable the output of alternator 21 of outdoor power equipment 10.

The conditioner section 40, trigger section 50, and drive section 60 contain the same components and are designed to function in the same manner as described in conjunction with FIG. 4 and FIGS. 6A-D above. However, the configuration and functionality of disable section 70 differs between the embodiments shown in FIG. 4 and FIGS. 6A-D as compared to FIG. 8 and FIGS. 9A-D.

The embodiment of disable section 70 shown in FIGS. 9A-D has a load interface 71, disable section output 79, disable resistor R1, disable capacitor C1, and disable TRIAC Q2. In this embodiment, disable section output 79 sends current to drive disable section interface 69 of drive section 60. In one embodiment, the second end 73 of disable resistor R1, cathode of disable capacitor C1, and gate of disable TRIAC Q2 are connected to comprise disable section output 79. In one embodiment, the first end 72 of disable resistor R1, anode of disable capacitor C1, and MT1 of disable TRIAC Q2 are connected to comprise load interface 71, which is connected to and receives power from the kill pin of ECM 26. MT2 of disable TRIAC Q2 is connected to ground Disable capacitor C1 filters transients to prevent false triggering of the gate of disable TRIAC Q2.

In operation, the current travelling through and exiting the emitter of trigger transistor Q1 imposes a voltage at gate of drive MOSFET Q3. More specifically, the current travelling through and exiting the emitter of trigger transistor Q1 travels through the drive voltage divider 68 comprised of second drive resistor R4 and third drive resistor R7. Drive voltage divider 68 imposes a voltage at the high impedance gate of drive MOSFET Q3 sufficient to cause drive MOSFET Q3 to conduct. Gate of drive MOSFET Q3 is located between second drive resistor R4 and third drive resistor R7.

Drive MOSFET Q3 normally has a high impedance path between drain and source, which does not allow current to pass between the drain and source of drive MOSFET Q3. However, when sufficient voltage is applied to gate of drive MOSFET Q3, the impedance of the path between drain and source becomes low, thereby allowing a third portion of the current provided by the kill pin of ECM 26 to be directed or diverted away from ECM 26 and flow along third current path 76. Third current path 76 is comprised of disable resistor R1, first drive resistor R3, dive diode D4, and drive MOSFET Q3. Further, disable resistor R1 and first drive resistor R3 of third current path 76 form a third current path voltage divider, with the gate of disable TRIAC Q2 connected between disable resistor R1 and first drive resistor R3. It can be seen that a node is formed by the second end 73 of disable resistor R1, first end 62 of first drive resistor R3, gate of disable TRIAC Q2, and cathode of disable capacitor C1.

Disable TRIAC Q2 is normally a high impedance path between terminal MT1 and MT2 when not triggered and not conducting. However, disable TRIAC Q2 acts as a low impedance path between MT1 and MT2 when triggered and conducting, thereby grounding kill pin of ECM 26. Accordingly, when a third portion of the current generated by ECM 26 flows along third current path 76, a voltage is produced at the gate of disable TRIAC Q2 sufficient to trigger the gate of disable TRIAC Q2. Further, the voltage produced at the gate of disable TRIAC Q2 is less than the voltage at MT1 of disable TRIAC Q2, due to third current path voltage divider formed by disable resistor R1 and drive resistor R3, and the voltage at grounded MT2 of disable TRIAC Q2 is less than the voltage at gate and MT1 of disable TRIAC Q2, which results in disable TRIAC Q2 conducting in quadrant 3.

When disable TRIAC Q2 conducts in quadrant 3, a second portion of current travels along a second current path 75 from ECM 26 to ground. The second current path 75 from ECM 26 to ground is comprised of disable TRIAC Q2, first drive resistor R3, drive diode D4, and drive MOSFET Q3. Current travelling along the second current path 75 exits ECM 26, enters disable TRIAC Q2 at MT1, exits disable TRIAC Q2 at gate, travels through first drive resistor R3 and drive diode D4, enters the drain of drive MOSFET Q3, and exits from the source of drive MOSFET Q3 to ground.

Current travelling along second current path 75 through disable TRIAC Q2 from MT1 to gate while disable TRIAC Q2 is operating in quadrant 3 causes disable TRIAC Q2 to conduct, thereby creating a first current path 74 from ECM 26 to ground for a first portion of current from ECM 26, thereby grounding the kill pin of ECM 26. First current path 74 from ECM 26 to ground is comprised of disable TRIAC Q2. Current travelling along the first current path 74 exits ECM 26, enters disable TRIAC Q2 at MT1, and exits MT2 of disable TRIAC Q2 at MT2 to ground. It is understood that when disable TRIAC Q2 is conducting, only a small amount of current produced by ECM 26 travels along third current path 76 and second current path 75, while the majority of the current produced by ECM 26 travels along the first current path 74, which is a low impedance path from ECM 26 to ground through conducting disable TRIAC Q2.

Removing current from ECM 26 through first current path 74 using disable TRIAC Q2 removes current from the circuit of ECM 26 and grounds the kill pin of ECM 26, thereby disabling the source of spark when ECM 26 is a digital spark advance module for engine 20 and stopping engine 20 of outdoor power equipment 10, or disabling the supply of fuel when ECM 26 is an electronic fuel injection module for engine 20 and stopping engine 20 of outdoor power equipment 10. Because drive MOSFET Q3 has a high input resistance, once disable TRIAC Q2 begins conducting, disable TRIAC Q2 remains in a state of continuous conduction for sufficient duration to disable engine 20.

As can be seen, while engine 20 is stopping, the output of alternator 21 is reduced and disable TRIAC Q2 is held in low impendence until the charge in drive capacitor C5 is discharged through third drive resistor R7, which causes the voltage at the gate of drive MOSFET Q3 to fall below the threshold voltage of drive MOSFET Q3 and drive MOSFET Q3 stops conducting.

In one embodiment, the charge on drive capacitor C5 falls below the threshold voltage of drive MOSET Q3 a few seconds after engine 20 stops rotating.

Stated alternatively, an alternator overvoltage protection circuit 30 comprises a TRIAC and a MOSFET, wherein TRIAC is disable TRIAC Q2 and MOSFET is drive MOSFET Q3. The TRIAC is electrically connected to the MOSFET and the TRIAC is electrically connected to ECM 26. The TRIAC is configured to ground the kill pin of ECM 26 when triggered by the MOSFET. Further, the MOSFET is electrically connected to alternator 21. The MOSFET is configured to conduct when the alternator operates in an overvoltage condition such as when the output voltage of alternator 21 exceeds an alternator overvoltage threshold.

Further, alternator 21 is connected to and rotated by engine 20. Additionally, the ECM 26 is connected to and provides spark and/or fuel to the engine 20. Accordingly, grounding the kill pin of ECM 26 with the TRIAC disables the engine 20 and stops the voltage output from the alternator 21.

In some embodiments, the alternator overvoltage protection circuit 30 further comprises a transistor, wherein the transistor is trigger transistor Q1. The transistor is electrically connected to the alternator 21 and configured to conduct when the alternator 21 operates in the overvoltage condition.

Also disclosed is a piece of outdoor power equipment 10 having an alternator overvoltage protection circuit 30 as described above in conjunction with the discussion of FIGS. 1-9D. The piece of outdoor power equipment 10 can be any piece of outdoor power equipment 10 that has an engine 20 with an alternator 21, such as, but not limited to, a riding lawn mower, a zero turn mower, or a garden tractor.

Further disclosed is a method of alternator overvoltage protection comprising providing a TRIAC and an alternator 21 rotated by an engine 20 having a magneto 22, wherein the alternator 21 outputs a voltage when rotated by the engine 20. The TRIAC is disable TRIAC Q2 and is configured to ground the magneto 22 when the alternator 21 operates in an overvoltage condition, thereby disabling the magneto 22, stopping the rotation of the engine 20, and stopping the alternator 21 from outputting voltage.

In some embodiments, the method further comprises providing a transistor and a MOSFET, wherein the transistor is trigger transistor Q1 and the MOSFET is drive MOSFET Q3. The transistor is configured to conduct when the alternator 21 operates in an overvoltage condition. The MOSFET is configured to conduct when a voltage is imposed on a gate of the MOSFET by the conducting transistor. Further, the MOSFET is configured to direct a portion of current from the magneto 22 to trigger a gate of the TRIAC when the MOSFET is conducting, thereby causing the TRIAC to conduct.

Also disclosed is another embodiment of a method of protecting a piece of outdoor power equipment 10 in an overvoltage condition of alternator 21. The method comprises providing a piece of outdoor power equipment 10 having an alternator overvoltage protection circuit 30. The alternator overvoltage protection circuit 30 includes a conditioner section 40, a trigger section 50, a drive section 60, and a disable section 70. The conditioner section 40 is connected to an alternator 21 having an output voltage. Alternator 21 is rotated by an engine 20 of the piece of outdoor power equipment 10. The disable section 70 is electrically connected to a load 80. The trigger section 50 is located between and electrically connected to the conditioner section 40 and the drive section 60. The drive section 60 is located between and electrically connected to the trigger section 50 and the disable section 70.

The method further comprises conditioning the voltage output received from the alternator 21 using the conditioner section 40, and providing the conditioned voltage to the trigger section 50. The conditioned voltage is received by the trigger section 50 from the conditioner section 40.

The method further comprises outputting current from the trigger section 50 to the drive section 60 when the alternator output voltage exceeds an alternator overvoltage threshold. Accordingly, the trigger section 50 does not output current to the drive section 60 when the alternator output voltage does not exceed the alternator overvoltage threshold.

The method further includes activating the disable section 70 using the drive section 60 when the drive section 60 receives current from the trigger section 50. Additionally, the method further includes, configuring the disable section 70 to divert or direct at least a portion of current away from the load 80 to a ground of the alternator overvoltage protection circuit 30, thereby disabling the engine 20. The portion of current diverted away from the load 80 travels to ground through a low impedance path of the alternator overvoltage protection circuit 30.

In some embodiments of the method, load 80 is a coil 23 of a component of that needs to receive power in order for engine 20 to operate. The disable section 70 diverts or directs at least a portion of current away from the coil 23 to a ground of the alternator overvoltage protection circuit 30 through a low impedance path when the disable section 70 is activated. Diverting or directing a portion of current away from the coil 23 to the ground either causes the coil 23 to drop out or causes a fuse to blow in a disable resistive element R8 that delivers power to the coil 23, thereby disabling the engine 20.

Further, in other embodiments of the method, the load 80 is a magneto 22 connected to and configured to supply spark to the engine 20; wherein the disable section diverts or directs at least a portion of current away from the magneto 22 to the ground of the alternator overvoltage protection circuit 30 through a low impedance path when the disable section 70 is activated, thereby removing spark from and disabling the engine 20.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Combinations of the above embodiments and other embodiments will be apparent to those of skill in the art upon studying the above description and are intended to be embraced therein. Therefore, the scope of the present invention is defined by the appended claims, and all devices, processes, and methods that come within the meaning of the claims, either literally or by equivalence, are intended to be embraced therein.

What is claimed is:

1. An alternator overvoltage protection circuit comprising:
    a TRIAC and a MOSFET;
        said TRIAC is electrically connected to said MOSFET, said TRIAC is electrically connected to a magneto, wherein said TRIAC is configured to ground said magneto when triggered by said MOSFET;
    said MOSFET is electrically connected to an alternator, wherein said MOSFET is configured to conduct when said alternator operates in an overvoltage condition; and
    a transistor, wherein said transistor is electrically connected to said alternator, wherein said transistor is configured to conduct when said alternator operates in said overvoltage condition; and
    wherein said MOSFET is configured to conduct when a voltage is imposed on a gate of said MOSFET by said conducting transistor; and wherein said MOSFET is configured to direct a portion of current from said magneto to trigger a gate of said TRIAC when said MOSFET is conducting, wherein a first voltage at a gate of said TRIAC and a second voltage at a first terminal of said TRIAC are less than a third voltage at a second terminal of said TRIAC causing said TRIAC to conduct.

2. The alternator overvoltage protection circuit of claim 1, wherein said alternator is connected to and rotated by an engine, wherein said magneto is connected to and provides spark to said engine.

3. The alternator overvoltage protection circuit of claim 2, wherein said alternator provides a voltage output; wherein grounding said magneto with said TRIAC disables said magneto and stops said voltage output from said alternator.

4. The alternator overvoltage circuit of claim 1, wherein said overvoltage condition is present when said alternator outputs a voltage greater than about 18.65VDC.

5. The alternator overvoltage circuit of claim 1, wherein said overvoltage condition is present when said alternator outputs a voltage greater than about 15 VDC.

6. The alternator overvoltage circuit of claim 1, wherein said overvoltage condition is present when said alternator outputs a voltage greater than about 20 VDC.

* * * * *